(12) United States Patent
Narayanan et al.

(10) Patent No.: US 12,284,277 B2
(45) Date of Patent: Apr. 22, 2025

(54) SERVICE PLATFORM/TRANSCEIVER DEVICE LOCKING SYSTEM

(71) Applicant: Dell Products L.P., Round Rock, TX (US)

(72) Inventors: Padmanabhan Narayanan, Chennai (IN); Ming Chung Chow, Pleasanton, CA (US)

(73) Assignee: Dell Products L.P., Round Rock, TX (US)

( * ) Notice: Subject to any disclaimer, the term of this patent is extended or adjusted under 35 U.S.C. 154(b) by 274 days.

(21) Appl. No.: 17/993,075

(22) Filed: Nov. 23, 2022

(65) Prior Publication Data

US 2024/0171388 A1    May 23, 2024

(51) Int. Cl.
*H04L 9/08* (2006.01)
*H04L 9/30* (2006.01)

(52) U.S. Cl.
CPC ............. *H04L 9/088* (2013.01); *H04L 9/30* (2013.01)

(58) Field of Classification Search
CPC ......... H04L 9/088; H04L 9/30; H04L 9/3247; H04L 9/32; H04L 9/63; H04L 9/3271
See application file for complete search history.

(56) References Cited

U.S. PATENT DOCUMENTS

| 2011/0029775 A1* | 2/2011 | Sakai ............... G06F 21/566 713/171 |
| 2013/0198834 A1* | 8/2013 | Kirsch ................ H04L 63/12 726/17 |
| 2015/0338917 A1* | 11/2015 | Steiner ............ H04M 1/72412 345/156 |

* cited by examiner

Primary Examiner — Khoi V Le
(74) Attorney, Agent, or Firm — Joseph Mencher

(57) ABSTRACT

A service platform/transceiver device locking system include a transceiver device that disables its data communication operations during an initialization operation and generates challenge information, and a platform device that retrieves that challenge information. The platform device uses a service platform private key to encrypt the challenge information, and provides the encrypted challenge information and a service-platform-provider-private-key-signed service platform public key to the transceiver device. The transceiver device uses a service platform provider public key to verify a service platform public key in the service-platform-provider-private-key-signed service platform public key to produce a verified service platform public key that it uses to decrypt the encrypted challenge information to produce decrypted challenge information. If the transceiver device determines that the decrypted challenge information matches the challenge information, it enables its data communication operations and locks itself to operate with a service platform associated with the service platform public key.

20 Claims, 27 Drawing Sheets

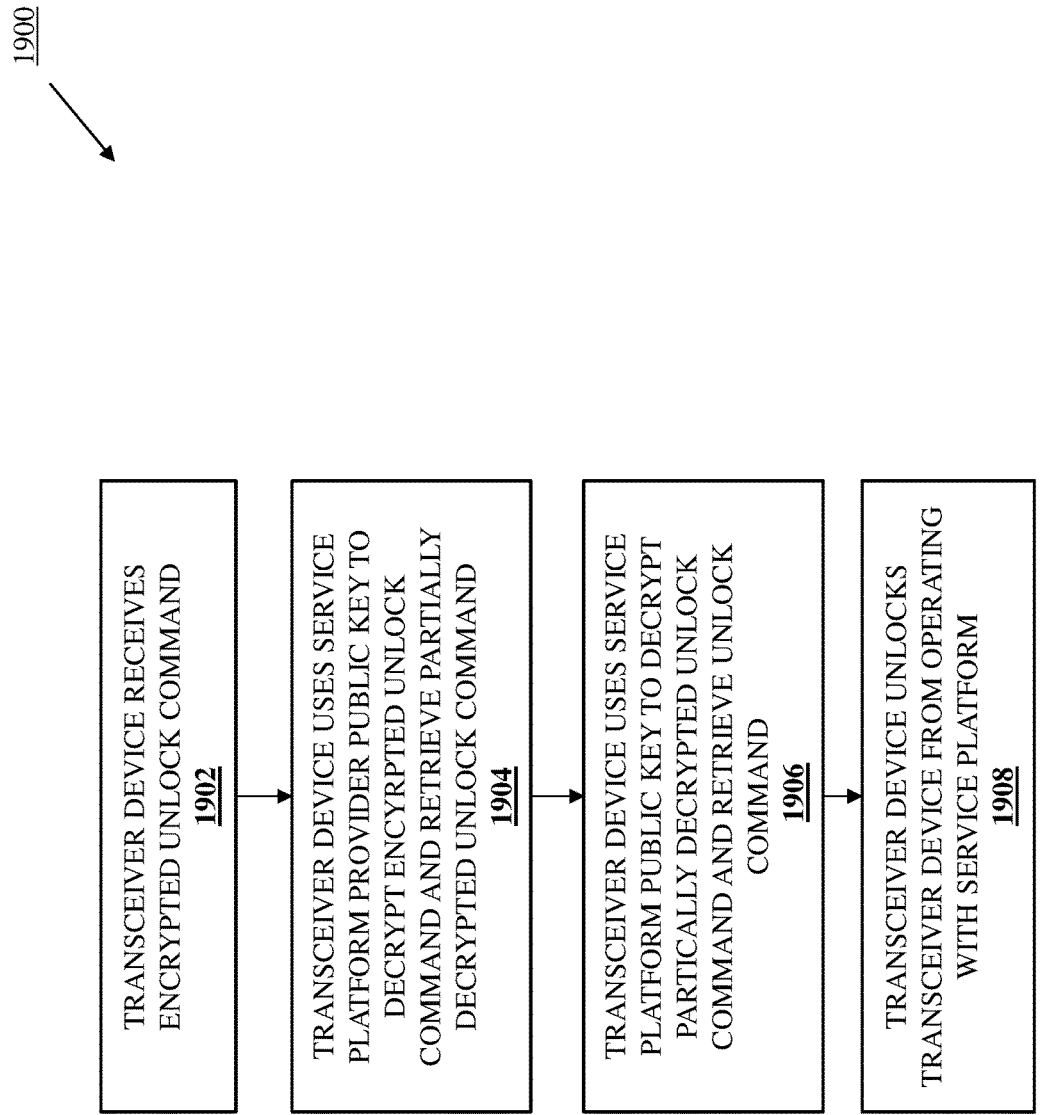

SERVICE PLATFORM/TRANSCEIVER DEVICE LOCKING SYSTEM

BACKGROUND

The present disclosure relates generally to information handling systems, and more particularly to locking transceiver devices to operate with a service platform provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices (e.g., switch devices), storage device, and server devices are sometimes provided by a service platform provider as a "service platform" that includes a group of platform devices that are configured to operate with each other to provide one or more services. Furthermore, platform devices often utilize transceiver devices in order to communicate with each other in order to provide service(s) as part of service platforms. For example, networking devices may utilize a plurality of transceiver devices connected to its ports in order to communicatively couple to server devices and storage devices and enable relatively high-speed communications (e.g., 1 GbE to 400 GbE, and up to 800 GbE in near-future deployments) between the platform devices. As will be appreciated by one of skill in the art in possession of the present disclosure, transceiver devices are relatively high-cost devices, and the capital expenditure on transceiver devices connected to a networking device is often several times that of the networking device itself.

One of skill in the art in possession of the present disclosure will recognize that transceiver devices may be "qualified" for particular networking devices based on those transceiver devices including relatively enhanced compatibility, functionality, and/or other operational capabilities with those networking devices as compared to "non-qualified" transceiver devices. However, users of networking devices are permitted to utilize non-qualified transceiver devices with their networking devices, but are often provided a warning when connecting a non-qualified transceiver device to a networking device. Despite this, users of networking devices continue to utilize non-qualified transceiver devices with networking devices, typically because those non-qualified transceiver devices are relatively lower cost than the qualified transceiver devices. The increased use of non-qualified transceiver devices with networking devices has resulted in a corresponding increase in support calls to networking device providers and/or service platform providers, as users of the networking device tend to look to the networking device provider and/or service platform provider when issues arise in its operation, even when those issues are caused by the use of non-qualified transceiver devices that are out of the control of the networking device provider and/or service platform provider. Such support calls utilize support resources of the networking device provider and/or service platform provider, resulting in increased costs. As such, it is desirable for networking device providers or service platform providers to incentivize the use of qualified transceiver devices with their networking devices and/or other platform devices.

Accordingly, it would be desirable to provide service platform/transceiver device system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a transceiver engine that is configured to: disable, during a first initialization operation following connection to a first platform device, data communication operations for the transceiver IHS; generate challenge information; receive, from the first platform device, encrypted challenge information and a service-platform-provider-private-key-signed service platform public key; verify, using a service platform provider public key, a service platform public key included in the service-platform-provider-private-key-signed service platform public key to produce a verified service platform public key; decrypt, using the verified service platform public key, the encrypted challenge information to produce decrypted challenge information; determine that the decrypted challenge information matches the challenge information and, in response: enable data communication operations for the transceiver IHS; and lock the transceiver IHS to operate with a service platform associated with the service platform public key.

BRIEF DESCRIPTION OF THE DRAWINGS

FIG. 19 is a flow chart illustrating an embodiment of a method for unlocking a transceiver device from operating with a service platform provided by a platform device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
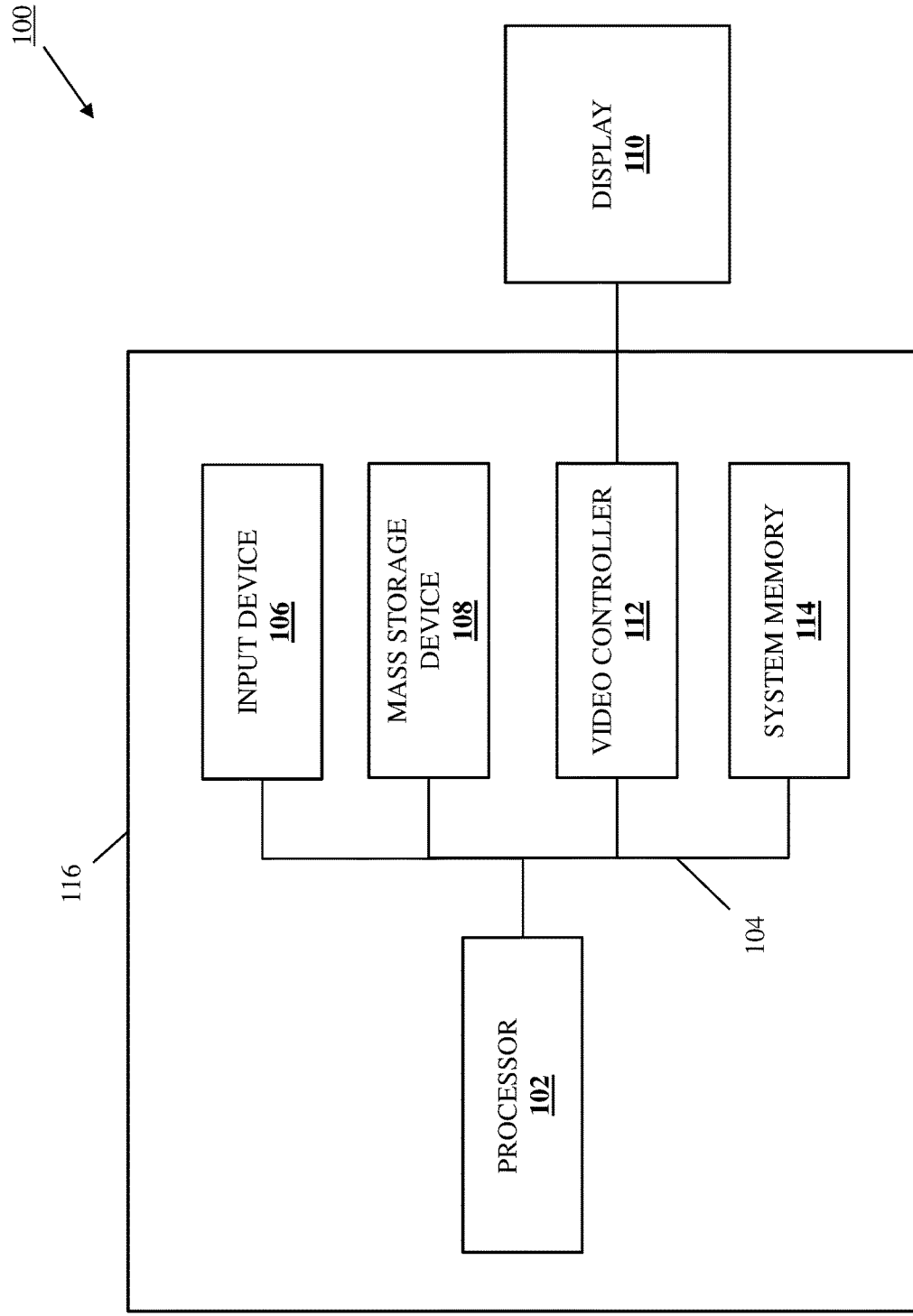
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
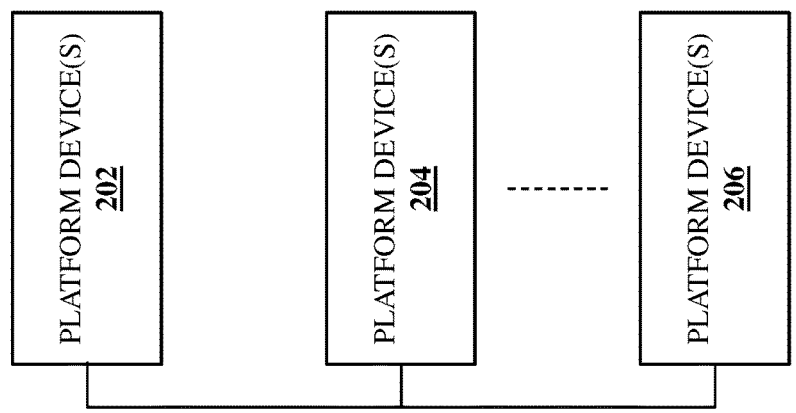
FIG. 2 is a schematic view illustrating an embodiment of a service platform.

Referring now to FIG. 2, an embodiment of a service platform 200 is illustrated. In the illustrated embodiment, the service platform 200 includes one or more platform devices 202. In an embodiment, the platform device(s) 202 may be provided by the IHS 100 discussed above with reference to FIG. 1, and/or may include some or all of the components of the IHS 100, and in specific examples may be provided by networking devices such as switch device. In the illustrated embodiment, the service platform 200 also includes one or more platform devices 204 that are coupled to the platform device(s) 202. In an embodiment, the platform device(s) 204 may be provided by the IHS 100 discussed above with reference to FIG. 1, and/or may include some or all of the components of the IHS 100, and in specific examples may be provided by server devices. In the illustrated embodiment, the service platform 200 also includes one or more platform devices 206 that are coupled to the platform device(s) 202 and the platform device(s) 204. In an embodiment, the platform device(s) 206 may be provided by the IHS 100 discussed above with reference to FIG. 1, and/or may include some or all of the components of the IHS 100, and in specific examples may be provided by storage systems. However, while illustrated and discussed as being provided by networking device, server devices, and storage systems, one of skill in the art in possession of the present disclosure will recognize that platform devices provided in the service platform 200 may include any devices that may be configured to operate similarly as the platform devices 202, 204, and/or 206 discussed below.

As will be appreciated by one of skill in the art in possession of the present disclosure, the platform devices 202, 204, and 206 and the service platform 200 may be provided by an Original Equipment Manufacturer (OEM) such as DELL® Inc. of Round Rock, Texas, United States, and/or other service platform providers known in the art. For example, the service platform provider may manufacture, configure, and/or otherwise provide each of the platform devices 202, 204, and 206 in order to provide networking device(s), server device(s), and storage system(s) that operate as the service platform 200 to perform any of a variety of service(s) that would be apparent to one of skill in the art in possession of the present disclosure. To provide a specific example, a user may order a service platform from the service platform provider to perform desired service(s), and the service platform provider may manufacture the platform devices 202, 204, and 206 and configure them (e.g., with hardware, software, firmware, etc.) to perform the service(s), and then provide the platform devices 202, 204, and 206 to the user as the service platform 200. As discussed below, in some embodiments, the service platform provider may generate a "service platform tag" or other unique identifier for any service platform ordered by any user, and thus each of the platform devices 202, 204, and 206 in the service platform 200 of FIG. 2 may be associated with a common service platform tag (e.g., the service platform tag/identifier "SERVICE TAG 200" in the examples below). However, while a specific service platform 200 has been illustrated and described, one of skill in the art in possession of the present disclosure will recognize that the service platform/transceiver device locking system of the present disclosure may be utilized in systems and/or subsystems other than service platforms while remaining within the scope of the present disclosure as well.

Figure 3:
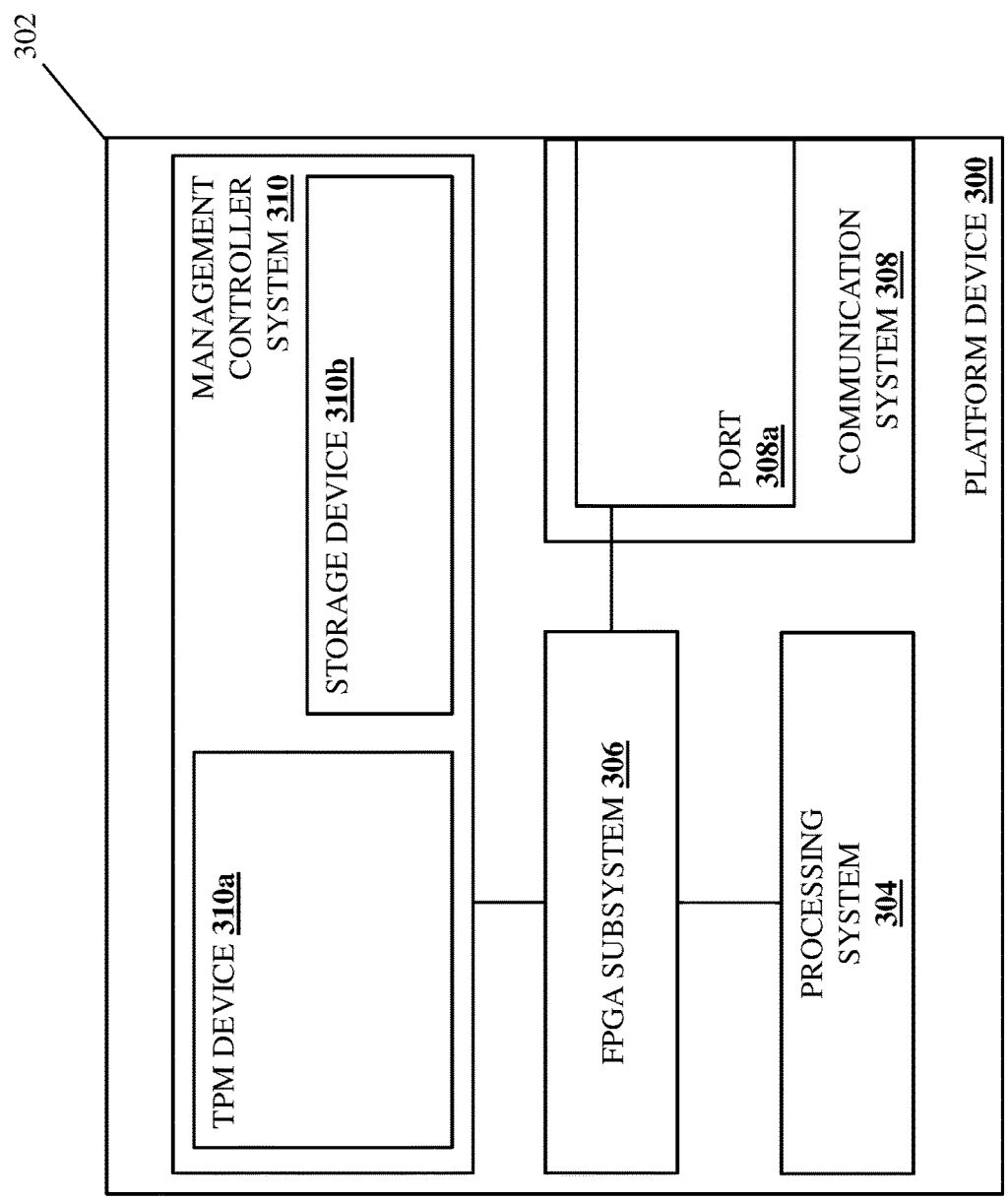
FIG. 3 is a schematic view illustrating an embodiment of a platform device that may be included in the service platform of FIG. 2.

Referring now to FIG. 3, an embodiment of a platform device 300 is illustrated that may provide any of the platform devices 202, 204, and/or 206 discussed above with reference to FIG. 2. As such, the platform device 300 may be provided by the IHS 100 discussed above with reference to FIG. 1 and/or may include some or all of the components of the IHS 100, and in the specific examples provided herein is described as being provided by a networking device such as a switch device. However, while illustrated and discussed as being provided by a networking device, one of skill in the art in possession of the present disclosure will recognize that the functionality of the platform device 300 discussed below may be provided by the server devices or storage systems discussed above, as well as any other devices that are configured to operate similarly as the platform device 300 discussed below. In the illustrated embodiment, the platform device 300 includes a chassis 302 that houses the components of the platform device 300, only some of which are illustrated and discussed below. For example, the chassis 302 may house a processing system 304 that may include the processor 102 discussed above with reference to FIG. 1, and in specific examples may be provided by a "host" Central Processing Unit (CPU) System on Chip (SoC) and/or other processing systems known in the art. As described in the specific examples provided below, the processing system 304 may be coupled to a memory system in the chassis 302 (not illustrated, but which may include the memory 114 discussed above with reference to FIG. 1) that includes instructions that, when executed by the processing system 304, cause the processing system 304 to provide Network Operating System (NOS) that is configured to perform the functionality of the NOS s and/or processing systems discussed below.

In the illustrated embodiment, the chassis 302 also houses a Field Programmable Gate Array (FPGA) subsystem 306 (e.g., an FPGA complex) that is coupled to the processing system 304 (e.g., via a Peripheral Component Interconnect express (PCIe) interface) and that may include an Inter-Integrated Circuit (I2C) controller block/arbiter and/or other FPGA components and/or functionality that would be apparent to one of skill in the art in possession of the present disclosure. The chassis 302 also houses the communication system 308 that includes a port 308a that is coupled to the FPGA subsystem 306 (e.g., via an I2C interface) and that is configured to connect to a transceiver device, discussed in further detail below. However, while the port 308a is illustrated and described herein as being coupled to the processing system 304 via the FPGA subsystem 306, one of skill in the art in possession of the present disclosure will appreciate how the processing system 304 and the port 308a may be coupled together using other techniques that will fall within the scope of the present disclosure as well. While not explicitly illustrated, one of skill in the art in possession of the present disclosure will appreciate how the port 308a may include a port connector that is configured to engage a transceiver connector on a transceiver device, discussed in further detail below.

In the illustrated embodiment, the chassis 302 also houses a management controller system 310 that is coupled to the FPGA subsystem 306 (e.g., via an I2C interface). For example, the management controller system 310 may be provided by a Platform Management Controller (PMC) that is configured to provide a PMC Operating System (PMC-OS), although other management controller systems are envisioned as falling within the scope of the present disclosure as well. However, while the port 308a is illustrated and described herein as being coupled to the management controller system 310 via the FPGA subsystem 306, one of skill in the art in possession of the present disclosure will appreciate how the management controller system 310 and the port 308a may be coupled together using other techniques that will fall within the scope of the present disclosure as well.

As illustrated, the management controller system 310 may include a Trusted Platform Module (TPM) device 310a that one of skill in the art in possession of the present disclosure will appreciate may include a secure cryptoprocessor provided by a dedicated microcontroller, chip, or other module that is configured to secure hardware using integrated cryptographic keys, although other subsystems that provide the functionality of the TPM device 310a are envisioned as falling within the scope of the present disclosure as well. As illustrated, the management controller system 310 may also include a storage device 310b that may be provided by a flash storage device and/or other storage devices that would be apparent to one of skill in the art in possession of the present disclosure. However, while a specific platform device 300 has been illustrated and described, one of skill in the art in possession of the present disclosure will recognize that platform devices (or other devices operating according to the teachings of the present disclosure in a manner similar to that described below for the platform device 300) may include a variety of components and/or component configurations for providing conventional platform device functionality (e.g., networking functionality in the specific examples provided below), as well as the functionality discussed below, while remaining within the scope of the present disclosure as well.

Figure 4A:
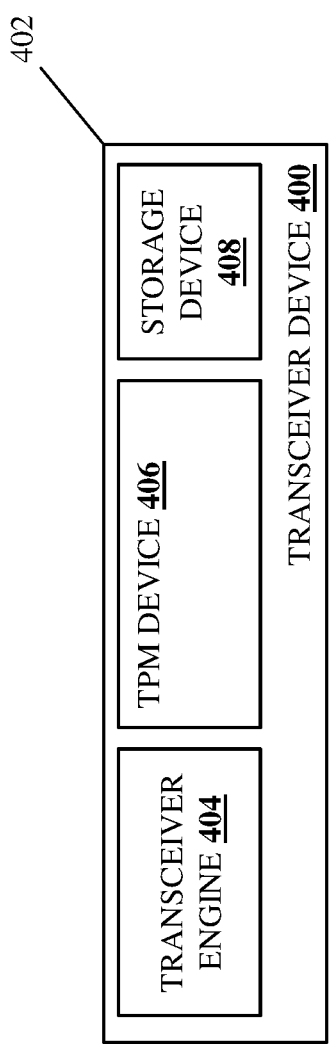
FIG. 4A is a schematic view illustrating an embodiment of a transceiver device that may be used with the platform device of FIG. 3 in the service platform of FIG. 2.

Referring now to FIG. 4A, an embodiment of a transceiver device 400 is illustrated that may be utilized with the platform device 300 of FIG. 3 and/or the service platform 200 of FIG. 2. In an embodiment, the transceiver device 400 may be provided by the IHS 100 discussed above with reference to FIG. 1 and/or may include some or all of the components of the IHS 100, and in different examples may be provided by any of a variety of transceiver devices (e.g., 100 GbE QSFP28 transceiver devices, 100 GbE SFP56-DD transceiver devices, 100 GbE SFP112 transceiver devices, 128GFC SFP112 transceiver devices, 200 GbE QSFP56 transceiver devices, 400 GbE QSFP56-DD transceiver devices, 800 GbE QDD and OSFP transceiver devices, etc.) that would be apparent to one of skill in the art in possession of the present disclosure. Furthermore, while illustrated and discussed as being provided by a transceiver device, one of skill in the art in possession of the present disclosure will recognize that the functionality of the transceiver device 400 discussed below may be provided by other devices that are configured to operate similarly as the transceiver device 400 discussed below. In the illustrated embodiment, the transceiver device 400 includes a chassis 402 that houses the components of the transceiver device 400, only some of which are illustrated and discussed below. For example, the chassis 402 may house a processing system (not illustrated, but which may include a processor similar to the processor 102 discussed above with reference to FIG. 1 such as a microcontroller or other transceiver processing system that would be apparent to one of skill in the art in possession of the present disclosure) and a memory system (not illustrated, but which may include a memory similar to the memory 114 discussed above with reference to FIG. 1) that is coupled to the processing system and that includes instructions that, when executed by the processing system, cause the processing system to provide a transceiver engine 404 (e.g., transceiver firmware) that is configured to perform the functionality of the transceiver engines and/or transceiver devices discussed below.

In the illustrated embodiment, the chassis 402 also houses a Trusted Platform Module (TPM) device 406 that is coupled to the transceiver engine 404 (e.g., via a coupling between the TPM device 406 and the processing system) and that one of skill in the art in possession of the present disclosure will appreciate may include a secure cryptoprocessor provided by a dedicated microcontroller, chip, or other module that is configured to secure hardware using integrated cryptographic keys, although other subsystems that provide the functionality of the TPM device 406 are envisioned as falling within the scope of the present disclosure as well. As illustrated, the chassis 402 also houses a storage device 406 that is coupled to the transceiver engine 404 (e.g., via a coupling between the storage device 408 and the processing system). For example, the storage device 406 may be provided by an Electronically Erasable Read Only Memory (EEPROM), although other storage devices are envisioned as falling within the scope of the present disclosure as well.

Figure 4B:
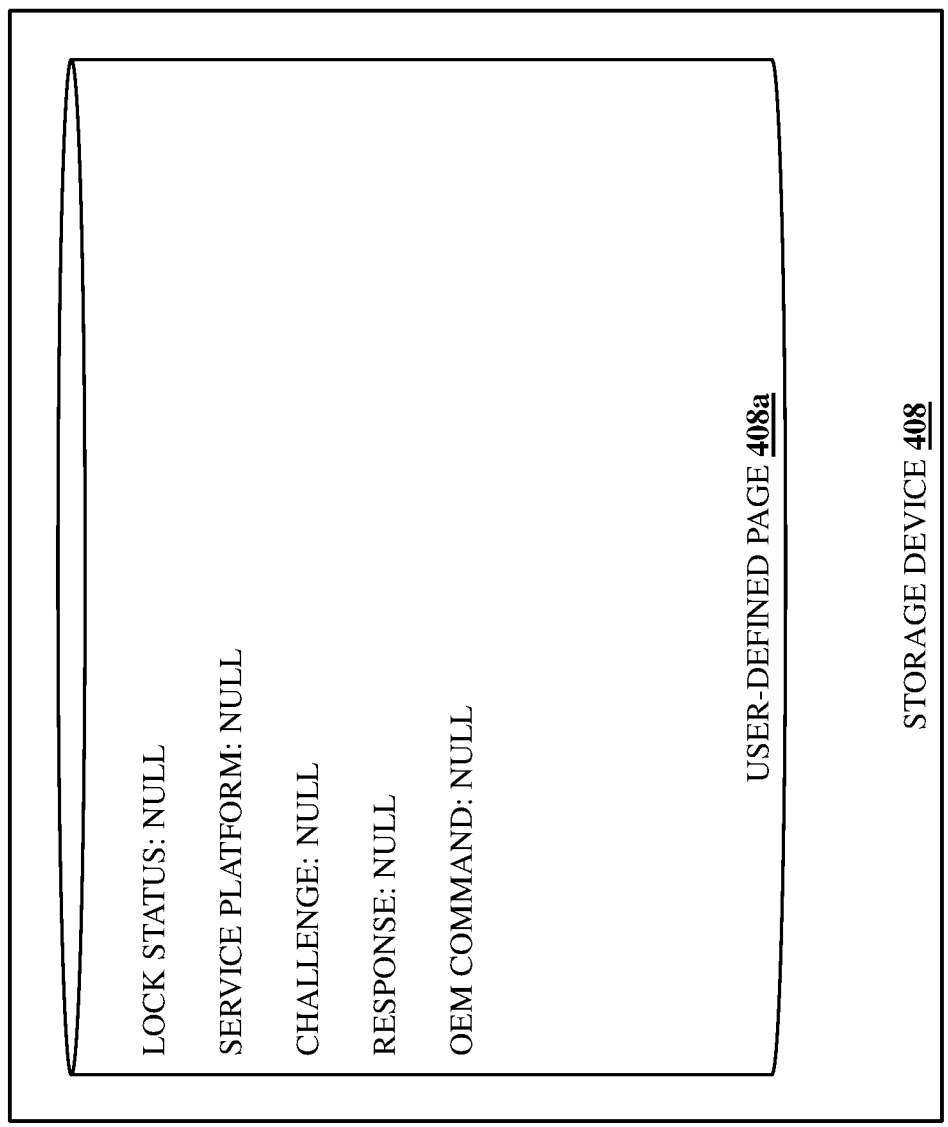
FIG. 4B is a schematic view illustrating an embodiment of a user-defined page in a storage device included in the transceiver device of FIG. 4A.

With reference to FIG. 4B, the storage device 408 may include a user-defined page 408a that, in the illustrated embodiment, includes a "LOCK STATUS" section that is configured to identify a lock status for the transceiver device 400 (e.g., "NULL" in the embodiment illustrated in FIG. 4B), a "SERVICE PLATFORM" section that is configured to identify a service platform tag or other identifier to which the transceiver device 400 may be locked (e.g., "NULL" in the embodiment illustrated in FIG. 4B), a "CHALLENGE" section that is configured to store a challenge generated by the transceiver device 400 (e.g., "NULL" in the embodiment illustrated in FIG. 4B), a "RESPONSE" section that may receive responses to challenges from a platform device (e.g., "NULL" in the embodiment illustrated in FIG. 4B), and an "OEM COMMAND" section that may receive commands from a service platform provider (e.g., "NULL" in the embodiment illustrated in FIG. 4B).

However, while a specific user-defined page 408a has been illustrated and described, one of skill in the art in possession of the present disclosure will recognize that the functionality provided by the user-defined page 408a in the storage device 408 described below may be provided by other data structures while remaining within the scope of the present disclosure as well. Furthermore, while a specific transceiver device 400 has been illustrated and described, one of skill in the art in possession of the present disclosure will recognize that transceiver devices (or other devices operating according to the teachings of the present disclosure in a manner similar to that described below for the transceiver device 400) may include a variety of components and/or component configurations (e.g., a transceiver connector that is configured to engage a port connector in the port 308a on the platform device 300) for providing conventional transceiver device functionality, as well as the functionality discussed below, while remaining within the scope of the present disclosure as well.

Figure 5:
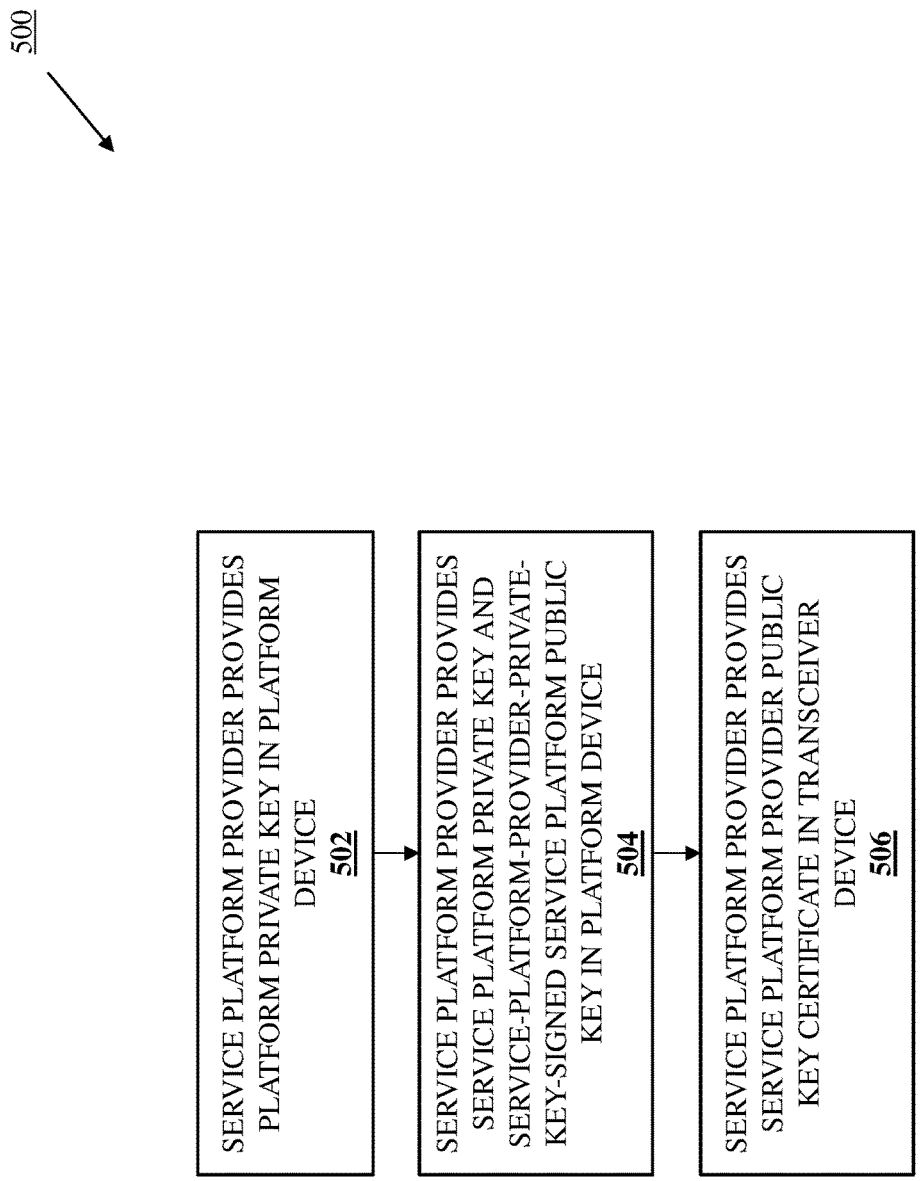
FIG. 5 is a flow chart illustrating an embodiment of a method for preparing a platform device and a transceiver device to allow the locking of the transceiver device to operate with a service platform provided by the platform device.

Referring now to FIG. 5, an embodiment of a method 500 for preparing a platform device and a transceiver device to allow the locking of the transceiver device to operate with a service platform provided by the platform device is illustrated. As discussed below, the systems and methods of the present disclosure provide for the locking of transceiver devices to service platforms provided by platform devices, and in preparation to perform such locking, the platform devices may be provided with platform private keys, service platform private keys, and service-platform-provider-private-key-signed service platform public keys, while the transceiver devices may be provided with service platform provider private key certificates. As described below, the information provided in the platform device and the transceiver device allow the transceiver device to be locked to operate with a service platform provided by the platform device, remain locked to operate with the service platform when moved between platform devices that provide the service platform, and be unlocked from operating with the service platform if desired.

As will be appreciated by one of skill in the art in possession of the present disclosure, the ability to lock transceiver devices to operate with service platforms allows a service platform provider to provide a customer all of the platform devices and transceiver devices needed to provide a service platform, while also allowing the service platform provider to offer the transceiver devices at a discounted cost that is contingent on their use only in the service platform. As such, the service platform provider can incentivize users to utilized qualified transceiver devices with the platform devices that provide their service platform by offering those transceiver devices at a cost similar to unqualified transceiver devices, thus reducing or eliminating the issues associated with the use of unqualified transceiver devices discussed above. Furthermore, in the event a user wishes to subsequently utilize their transceiver devices with devices that are not included in the service platform, that user may pay to unlock those transceiver devices (e.g., a cost equal to the difference between the discounted and non-discounted price of the transceiver devices), thus allowing users the freedom to utilize the transceiver devices outside the service platform if desired.

The method 500 begins at block 502 where a service platform provider provides a platform private key in a platform device. In an embodiment, prior to or during the method 500, the service platform provider (e.g., an OEM such as DELL® Inc. of Round Rock, Texas, United States) may generate a platform private key for the platform device 300. As discussed above, the platform device 300 may be manufactured, configured, and/or otherwise provided by the service platform provider as part of a service platform that includes a plurality of platform devices ordered by a user, and as part of that service platform configuration the service platform provider may generate a service platform tag (e.g., "SERVICE PLATFORM 200" in the examples below) or other unique identifier that identifies the service platform and that is associated with each of the platform devices that provide that service platform. In some examples, the service platform provider may generate a platform public key and a platform private key (e.g., a platform "public/private key pair") for each platform device that provides the service platform, and one of skill in the art in possession of the present disclosure will appreciate how the platform public/private key pair generated for each platform device may be unique to that platform device (i.e., a platform public/private key pair for the platform device 300 that provides a service platform may be unique to the platform device 300 and different than respective platform public/private key pairs generated for each of the other platform devices that provide that service platform).

Figure 6A:
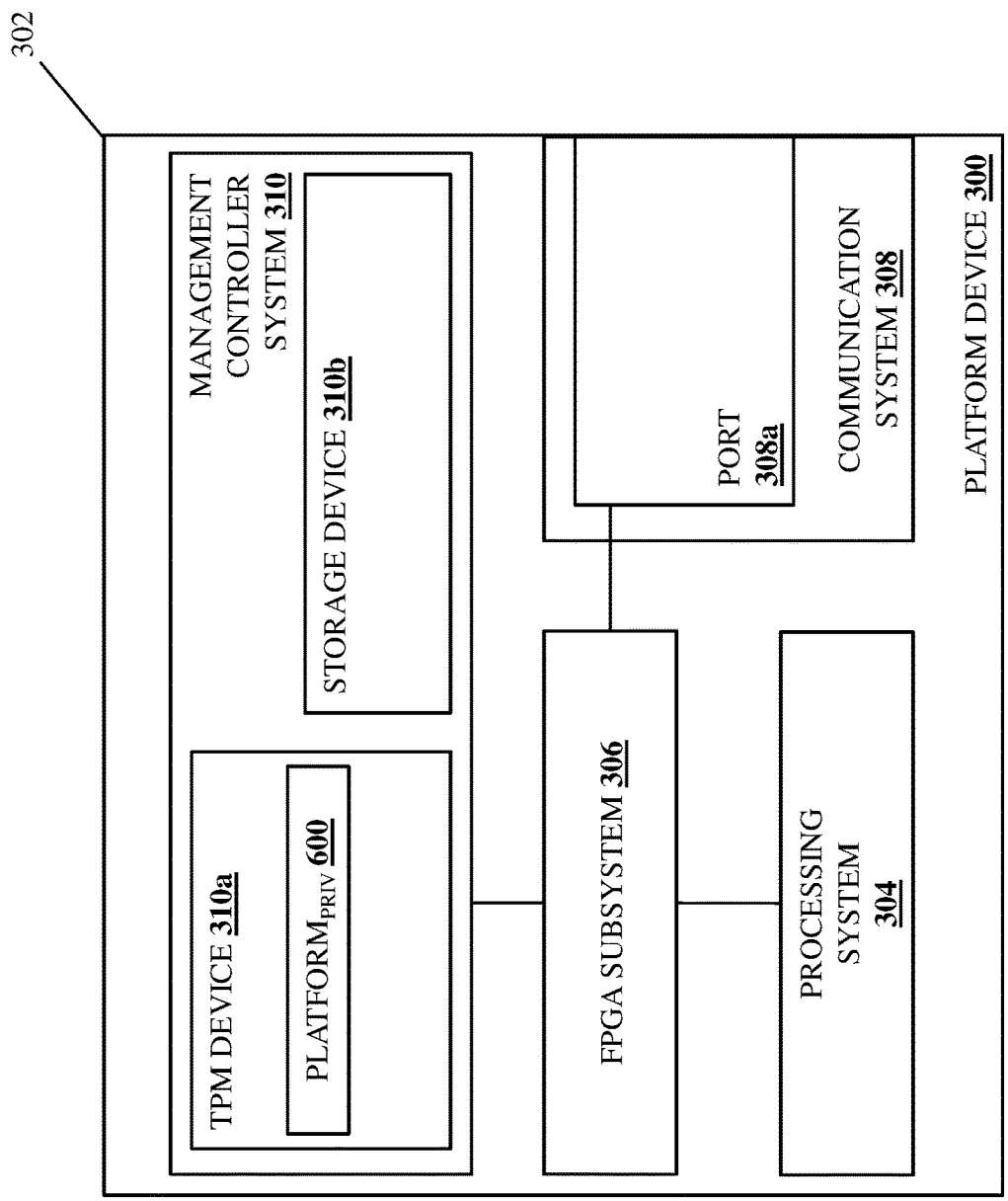
FIG. 6A is a schematic view illustrating an embodiment of the platform device of FIG. 3 operating during the method of FIG. 5.

With reference to FIG. 6A, in an embodiment of block 502, the platform service provider may provide a platform private key ("PLATFORM$_{PRIV}$") 600 in the TPM device 310 included in the management controller system 310 of the platform device 300, and one of skill in the art in possession of the present disclosure will appreciate how a respective unique platform private key may be provided in the TPM device included in the management controller system in each of the platform devices 202, 204, and 206 that provide the service platform 200 discussed above with reference to FIG. 2.

The method 500 then proceeds to block 504 where the service platform provider provides a service platform private key and a service-platform-provider-private-key-signed service platform public key in the platform device. In an embodiment, prior to or during the method 500, the service platform provider (e.g., an OEM such as DELL® Inc. of Round Rock, Texas, United States) may generate a service platform private key for the service platform 200 that includes the platform device 300. In some examples, the service platform provider may generate a service platform public key and a service platform private key (e.g., a service platform "public/private key pair") for the service platform 200, and one of skill in the art in possession of the present disclosure will appreciate how the service platform public/private key pair generated for the service platform 200 may be unique to that service platform 200 (i.e., a service platform public/private key pair for the service platform 200 may be unique to the service platform 200 and different than respective service platform public/private key pairs generated for other service platforms provided by the service platform provider). Furthermore, one of skill in the art in possession of the present disclosure will appreciate how the service platform provider may have a service platform provider public key and a service platform provider private key (e.g., a service platform provider "public/private key pair") that is unique to the service platform provider.

Figure 6B:
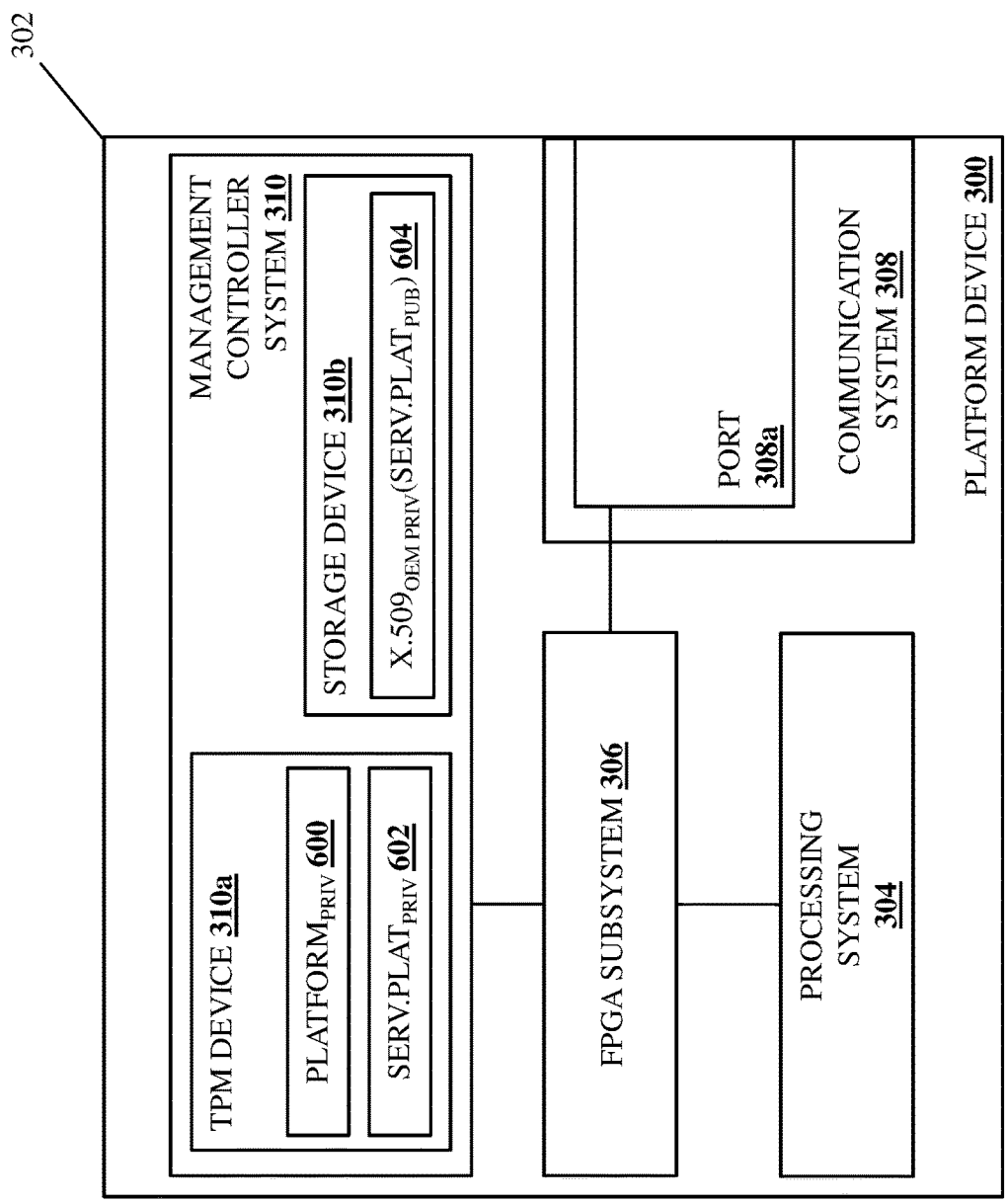
FIG. 6B is a schematic view illustrating an embodiment of the platform device of FIG. 3 operating during the method of FIG. 5.

With reference to FIG. 6B, in an embodiment of block 504, the platform service provider may provide a service platform private key ("SERV.PLAT$_{PRIV}$") 602 in the TPM device 310 included in the management controller system 310 of the platform device 300, and one of skill in the art in possession of the present disclosure will appreciate how the service platform private key may be provided in the TPM device included in the management controller system in each of the platform devices 202, 204, and 206 that provide the service platform 200 discussed above with reference to FIG. 2. Furthermore, at block 504, the service platform provider may sign the service platform public key for the service platform 200 with the service platform provider private key to produce a service-platform-provider-private-key-signed service platform public key ("X.509$_{OEM\ PRIV}$ (SERV.PLAT$_{PUB}$)") 604 and provide that service-platform-provider-private-key-signed service platform public key in the storage device 310b included in the management controller system 310 of the platform device 300. However, while the service-platform-provider-private-key-signed service platform public key is illustrated and described as being provided by an X.509 certificate, one of skill in the art in possession of the present disclosure will appreciate how the service-platform-provider-private-key-signed service platform public key may be provided using other techniques while remaining within the scope of the present disclosure as well.

Figure 6C:
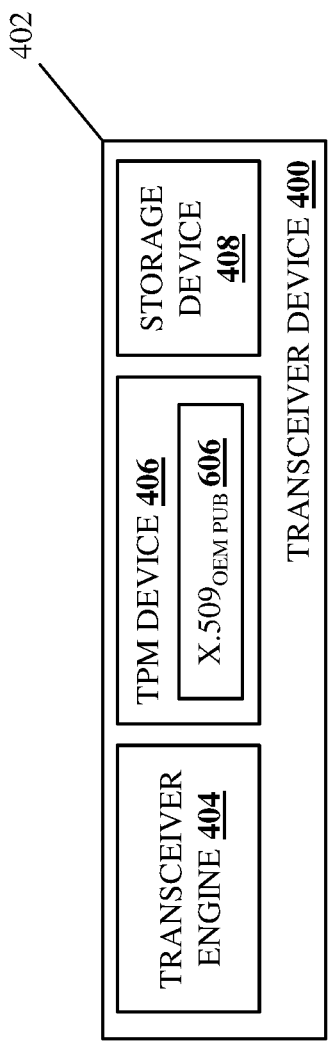
FIG. 6C is a schematic view illustrating an embodiment of the transceiver device of FIG. 4A operating during the method of FIG. 5.

The method 500 then proceeds to block 506 where the service provider platform provides a service platform provider public key certificate in a transceiver device. With reference to FIG. 6C, in an embodiment of block 506, the platform service provider may provide a service platform provider public key certificate ("X.509$_{OEM\ PUB}$") 606 in the TPM device 406 included in the transceiver device 400, and one of skill in the art in possession of the present disclosure will appreciate how the service platform provider public key certificate may be provided in the TPM device included in any transceiver device provided for use with the service platform 200. As will be appreciated by one of skill in the art in possession of the present disclosure, the service platform provider public key certificate provides the service platform provider public key in the transceiver device 400 in a manner that may be verified by the transceiver engine 404. However, while the service platform provider public key certificate is illustrated and described as being provided by an X.509 certificate, one of skill in the art in possession of the present disclosure will appreciate how the service platform provider public key certificate may be provided using other techniques while remaining within the scope of the present disclosure as well. As will be appreciated by one of skill in the art in possession of the present disclosure, following block 506 of the method 500, the platform device 300 and the transceiver device 400 are configured to allow the transceiver device 400 to be locked to operate with the service platform 200 provided by platform devices 202/300, 204/300, and 206/300, while allowing the transceiver device 400 to be unlocked from operating with that service platform 200 if desired.

Figure 7:
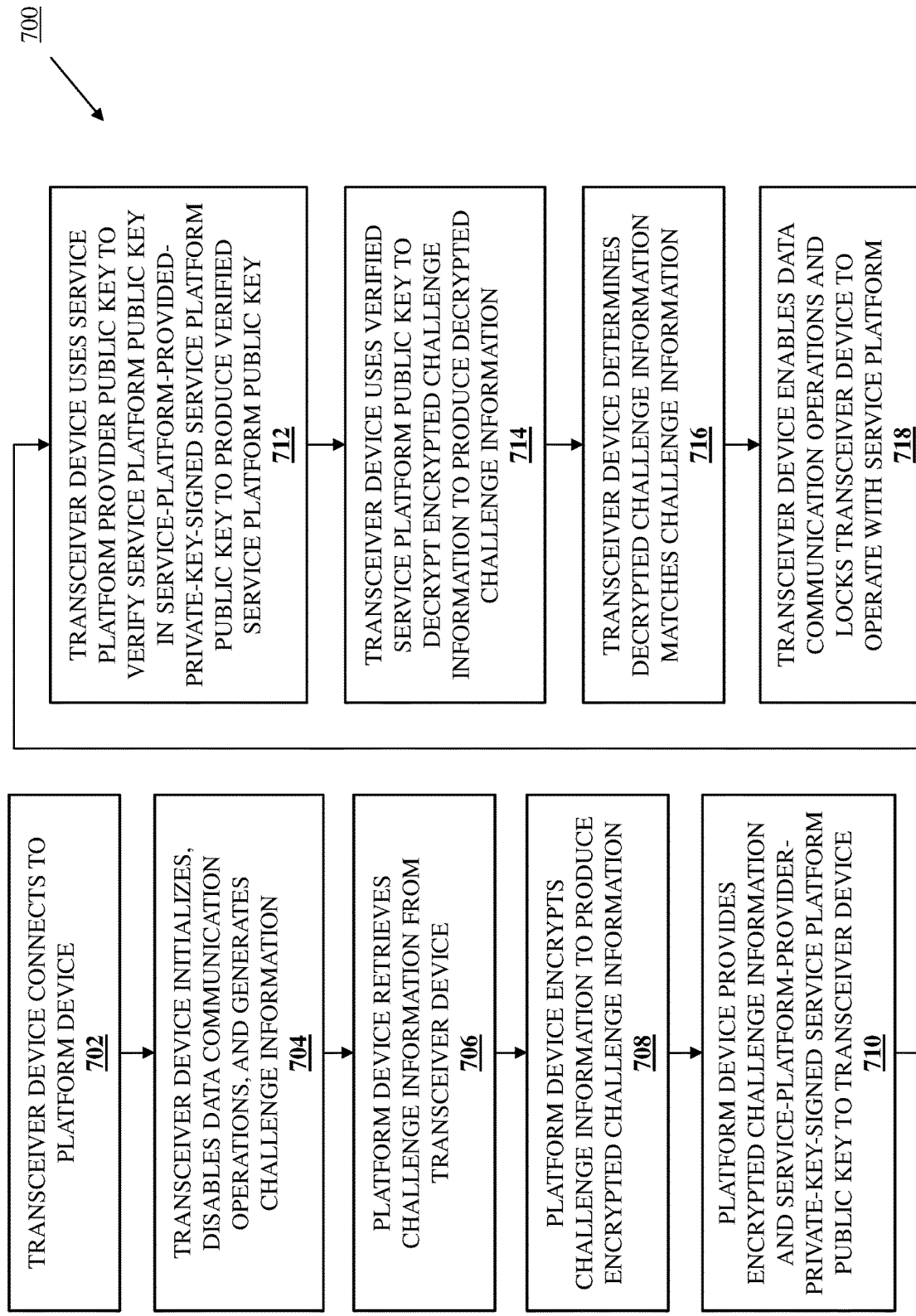
FIG. 7 is a flow chart illustrating an embodiment of a method for locking a transceiver device to operate with a service platform provided by a platform device.

Referring now to FIG. 7, an embodiment of a method 700 for locking a transceiver device to operate with a service platform provided by a platform device is illustrated. As discussed below, the systems and methods of the present disclosure provide for the locking of a transceiver device to a service platform provided by platform devices during a first initialization/power up of that transceiver device in one of those platform devices, thus preventing subsequent use of that transceiver device with a device that is not included in/does not provide that service platform. For example, the service platform/transceiver device locking system of the present disclosure may include a transceiver device that disables its data communication operations during an initialization operation and generates challenge information, and a platform device that retrieves that challenge information. The platform device uses a service platform private key to encrypt the challenge information, and provides the encrypted challenge information and a service-platform-provider-private-key-signed service platform public key to the transceiver device. The transceiver device uses a service platform provider public key to verify a service platform public key in the service-platform-provider-private-key-signed service platform public key to produce a verified service platform public key that it uses to decrypt the encrypted challenge information to produce decrypted challenge information. If the transceiver device determines that the decrypted challenge information matches the challenge information, it enables its data communication operations and locks itself to operate with a service platform associated with the service platform public key.

Figure 8:
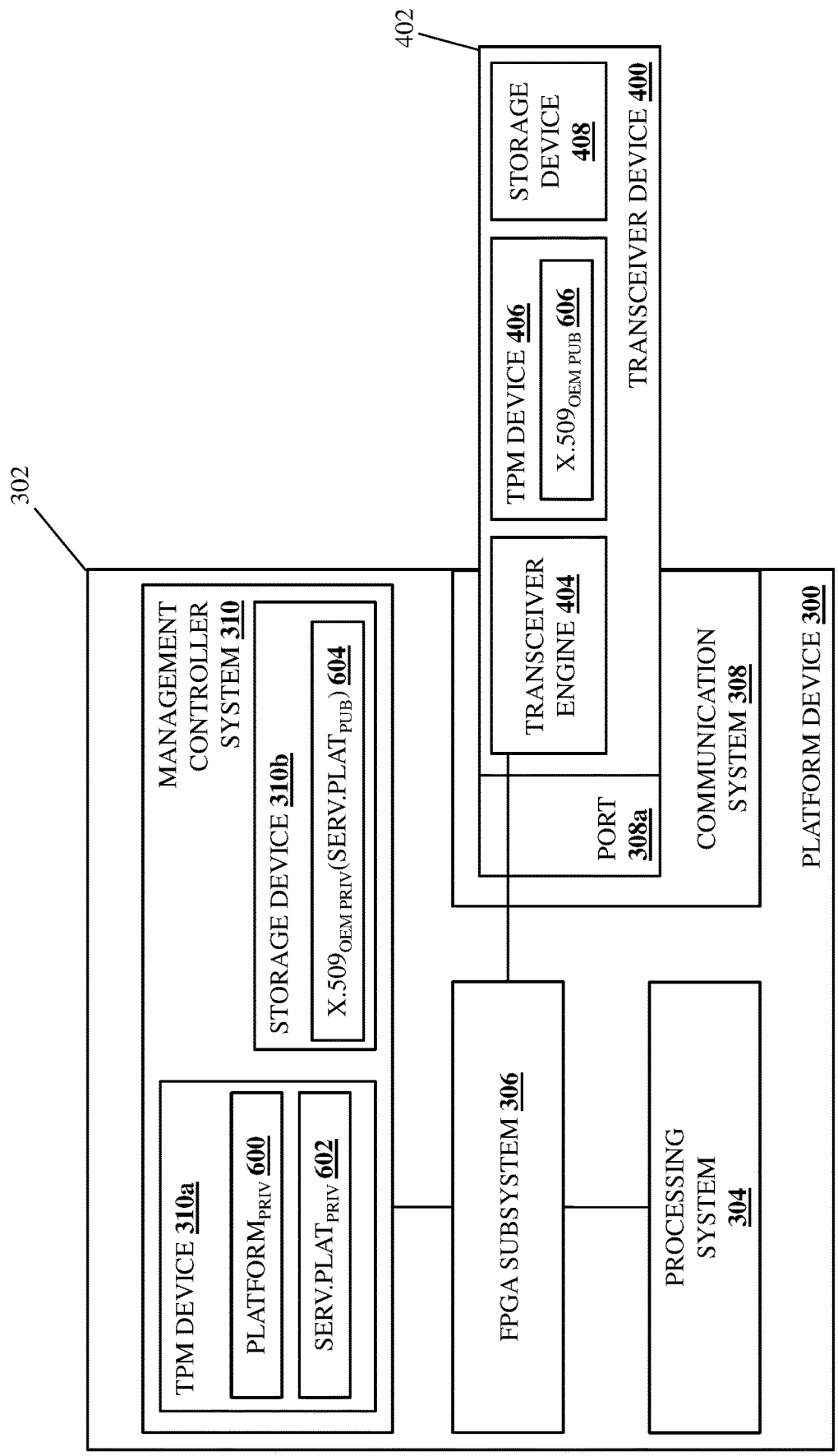
FIG. 8 is a schematic view illustrating an embodiment of the transceiver device of FIG. 4A connected to the platform device for FIG. 3 during the method of FIG. 7.

The method 700 begins at block 702 where a transceiver device connects to a platform device. With reference to FIG. 8, in an embodiment of block 702, the transceiver device 400 may be connected to the platform device 300. For example, the transceiver device 400 may be positioned adjacent the port 308a in the communication system 308 of the platform device 300 such that a transceiver connector on the transceiver device 400 is aligned with the port 308a. The transceiver device 400 may then be moved towards the port 308a such that the transceiver connector engages a port connector that is included in the port 308a. As will be appreciated by one of skill in the art in possession of the present disclosure, with the transceiver device 400 connected to the port 308a as illustrated in FIG. 8, the transceiver engine 404 may be coupled to the FPGA subsystem 306 (e.g., via the transceiver connector/port connector engagement) and configured to transmit data to either of the processing system 304 and the management controller system 310.

The method 700 then proceeds to block 704 where the transceiver device initializes, disables data communication operations, and generates challenge information. In an embodiment, at block 704, the transceiver device 400 may power on or otherwise initialize. For example, following the connection of the transceiver device 400 to the platform device 300, the platform device 300 may be powered on and/or otherwise initialized and, in response, may provide power to the transceiver device 400 in order to allow the transceiver device 400 to power on or otherwise initialize. However, in other embodiments, the transceiver device 400 may be connected to powered on or otherwise initialized platform device 300 and, in response, may power on or otherwise initialize. In a specific example, the initialization of the transceiver device 400 may include the booting or other initialization of transceiver firmware in the transceiver device 400 that provides at least some of the functionality of the transceiver engine 404.

Figure 9:
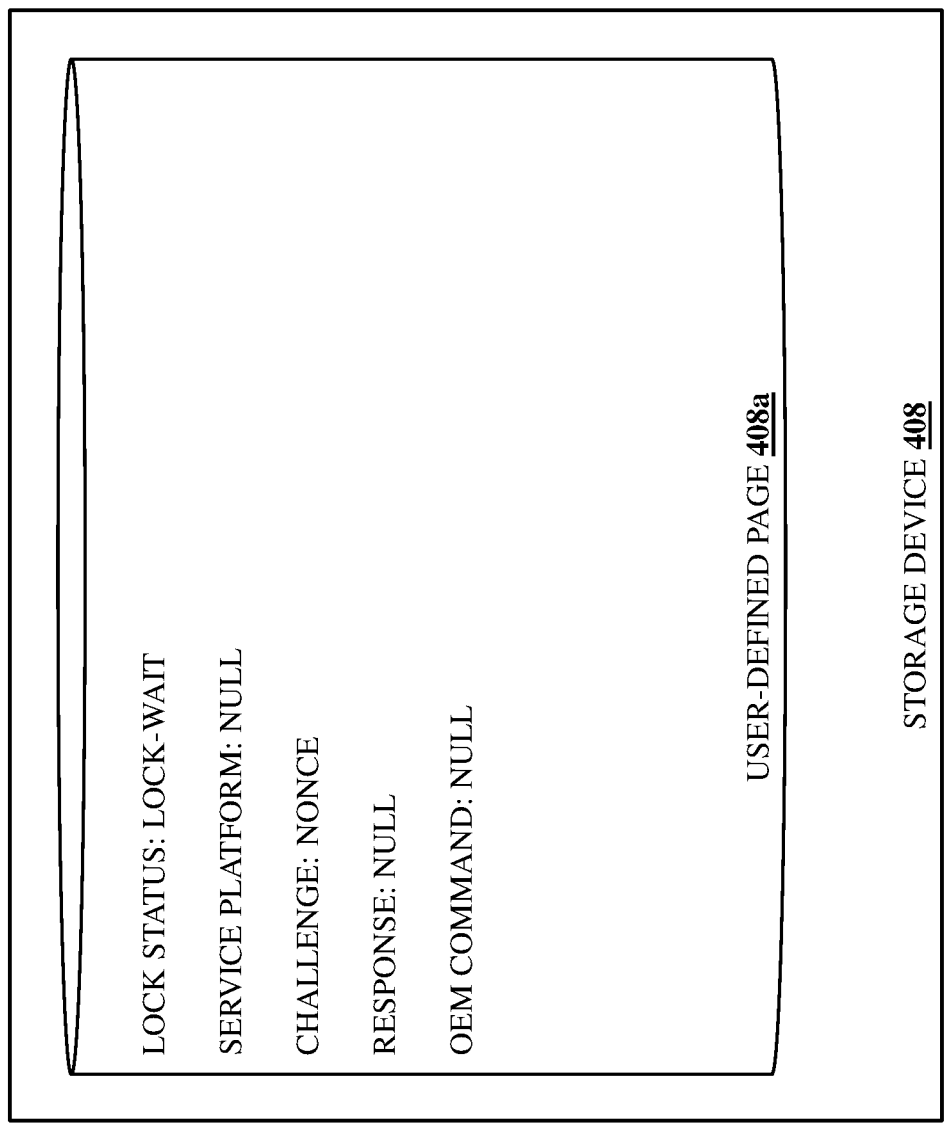
FIG. 9 is a schematic view illustrating an embodiment of the user-defined page in the storage device of FIG. 4B during the method of FIG. 7.

At block 704, in response to powering on or otherwise initializing, the transceiver engine 404 in the transceiver device 400 may perform data communication disabling operations that include disabling the ability of the transceiver device 400 to send or receive data communications using any of a variety of data communication disabling techniques that would be apparent to one of skill in the art in possession of the present disclosure. With reference to FIG. 9, in response to performing the data communication disabling operations, the transceiver engine 404 may provide the "LOCK STATUS" section of the user-defined page 408a in the storage device 408 of the transceiver device 400 with a lock-wait status for the transceiver device 400 (e.g., "LOCK-WAIT" in the illustrated embodiment). Furthermore, at block 704, the transceiver engine 404 may also perform challenge information generation operations to generate challenge information. For example, the challenge information generation operations may include generating a cryptographic nonce or other challenge information known in the art, and providing that cryptographic nonce in the "CHALLENGE" section of the user-defined page 408a in the storage device 408 of the transceiver device 400 (e.g., "NONCE" in the illustrated embodiment).

Figure 10:
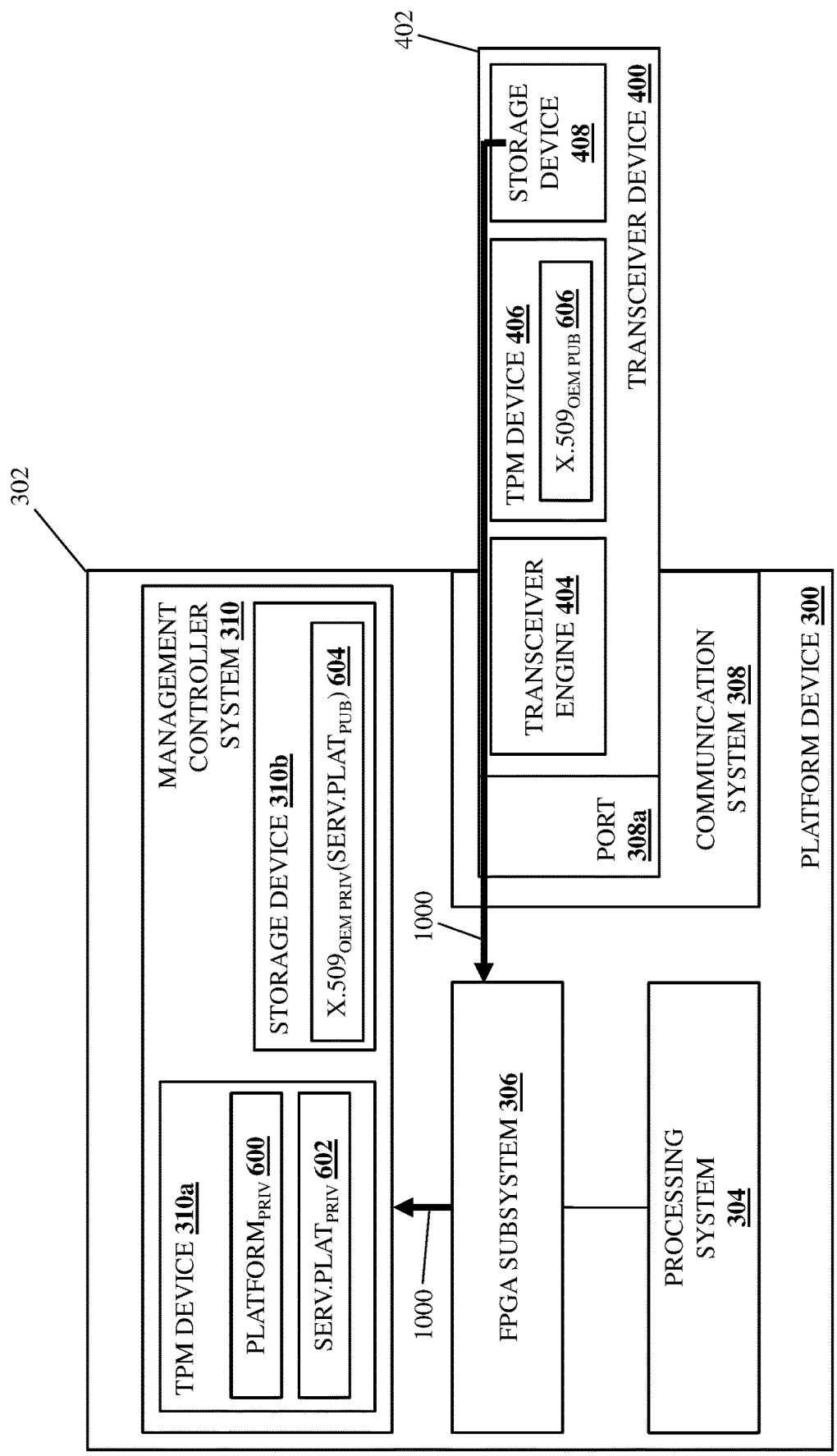
FIG. 10 is a schematic view illustrating an embodiment of the transceiver device and platform device of FIG. 8 operating during the method of FIG. 7.

The method 700 then proceeds to block 706 where the platform device retrieves the challenge information from the transceiver device. With reference to FIG. 10, in an embodiment of block 706, the management controller system 310 in the platform device 300 may perform challenge information retrieval operations 1000 that may include accessing the storage device 408 in the transceiver device 400 (e.g., directly, through the transceiver engine 404, etc.) via the FPGA subsystem 306, and retrieving the challenge information from the "CHALLENGE" section of the user-defined page 408a in the storage device 408 of the transceiver device 400. For example, in response to initialization of the transceiver device 400, the management controller device 310 may detect the transceiver device 400 connected to the port 308a (e.g., based on a ModPrsL/interrupt signal) and, in response, may read an EEPROM in the transceiver device 400 that provides the storage device 408 and determine that the transceiver device 400 includes the lock-wait status (i.e., based on "LOCK-WAIT" provided in the "LOCK STATUS" section of the user-defined page 408a in the storage device 408 of the transceiver device 400). In response to determining that the transceiver device 400 includes the lock-wait status, the management controller device 310 may retrieve the cryptographic nonce or other challenge information (i.e., "NONCE") from the "CHALLENGE" section of the user-defined page 408a in the storage device 408 of the transceiver device 400.

The method 700 then proceeds to block 708 where the platform device encrypts the challenge information to produce encrypted challenge information. In an embodiment, at block 708, the management controller system 310 in the platform device 300 may use the service platform private key ("SERV.PLAT$_{PRIV}$") 602 stored in the TPM device 310a to encrypt the challenge information in order to produce encrypted challenge information. For example, at block 708, management controller system 310 may use the service platform private key to encrypt the cryptographic nonce or other challenge information to produce the encrypted challenge information ("E$_{SERV.PLAT\ PRIV}$ (NONCE)"). In the specific examples provided below, at block 708, the management controller system 310 uses the service platform private key to encrypt the cryptographic nonce or other challenge information along with a lock command to produce the encrypted challenge information ("$E_{SERV.PLAT\ PRIV}$(LOCK, NONCE)") that includes the lock command, but one of skill in the art in possession of the present disclosure will appreciate how the inclusion of the lock command in the encrypted challenge information may be optional in some embodiments.

Figure 11A:
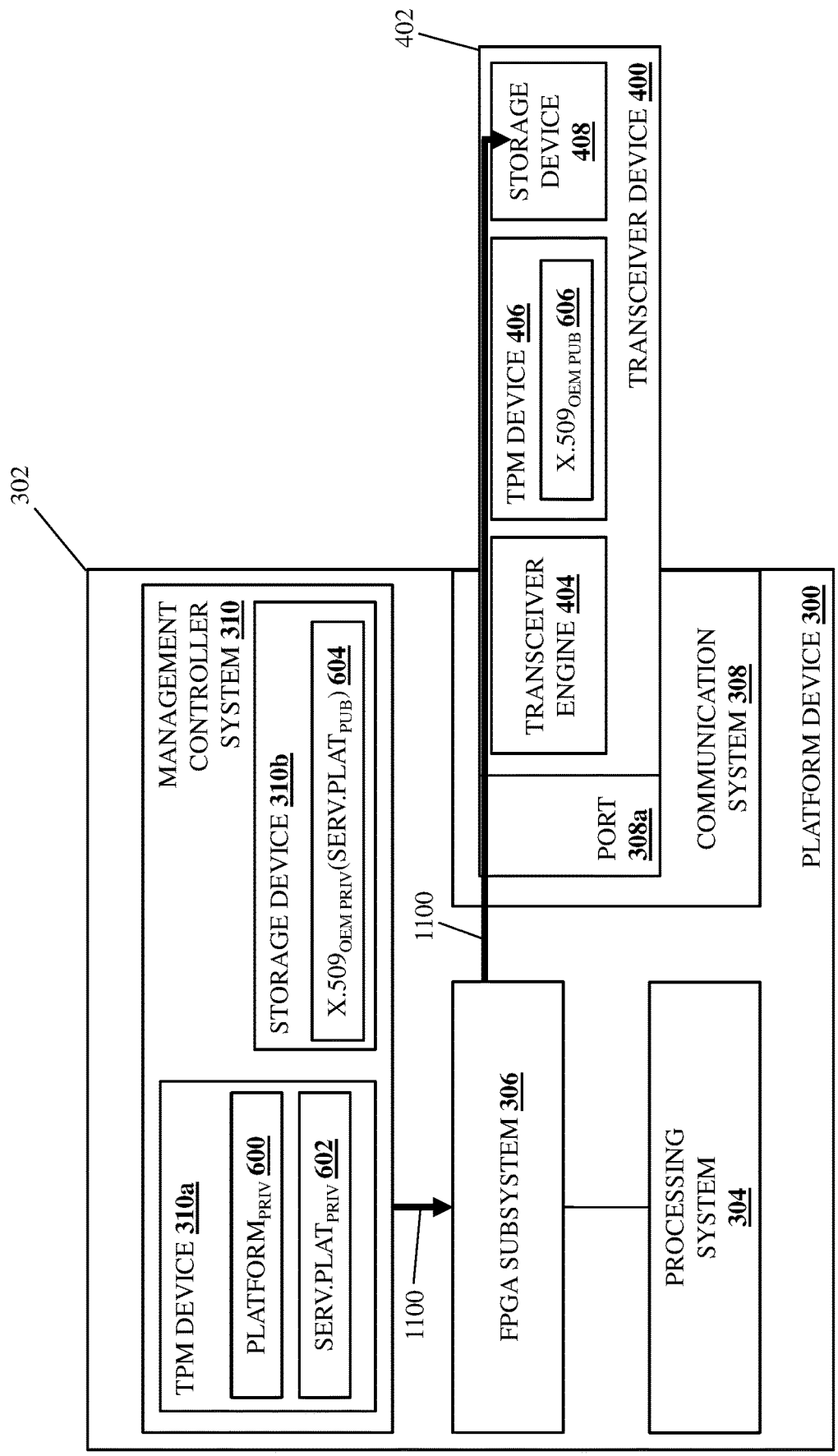
FIG. 11A is a schematic view illustrating an embodiment of the transceiver device and platform device of FIG. 8 operating during the method of FIG. 7.
Figure 11B:
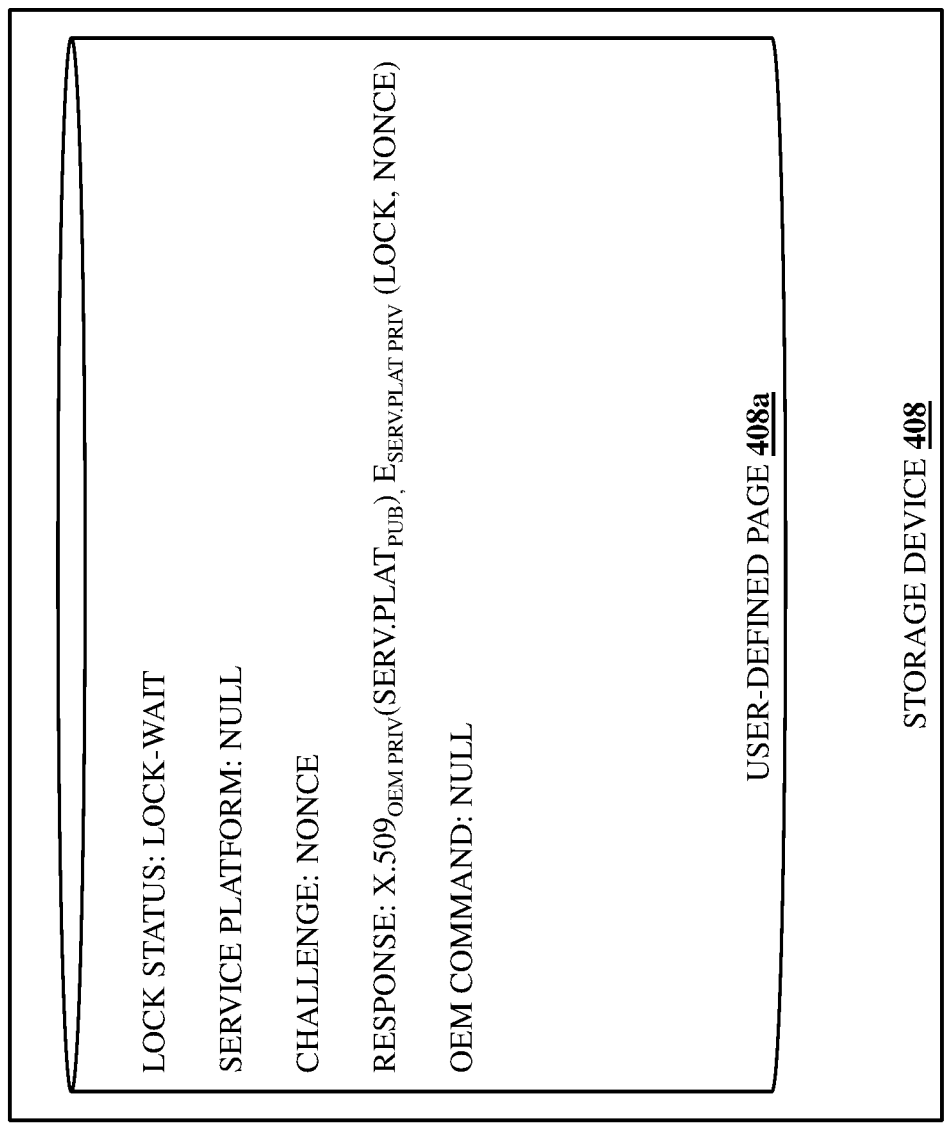
FIG. 11B is a schematic view illustrating an embodiment of the user-defined page in the storage device of FIG. 4B during the method of FIG. 7.

The method 700 then proceeds to block 710 where the platform device provides the encrypted challenge information and a service-platform-provider-private-key-signed service platform public key to the transceiver device. With reference to FIGS. 11A and 11B, in an embodiment in an embodiment of block 710, the management controller system 310 in the platform device 300 may retrieve the service-platform-provider-private-key-signed service platform public key ("$X.509_{OEM\ PRIV}(SERV.PLAT_{PUB})$") 604 from its storage device 310b and perform encrypted challenge information/service-platform-provider-private-key-signed service platform public key provisioning operations 1100 that may include accessing the storage device 408 in the transceiver device 400 (e.g., directly, through the transceiver engine 404, etc.) via the FPGA subsystem 306, and providing the encrypted challenge information ("$E_{SERV.PLAT\ PRIV}$(LOCK, NONCE)") and the service-platform-provider-private-key-signed service platform public key ("$X.509_{OEM\ PRIV}(SERV.PLAT_{PUB})$") 604 in the "RESPONSE" section of the user-defined page 408a in the storage device 408 of the transceiver device 400.

The method 700 then proceeds to block 712 where the transceiver device uses a service platform provider public key to verify a service platform public key in the service-platform-provider-private-key-signed service platform public key to produce a verified service platform public key. In an embodiment, at block 712, the transceiver engine 404 in the transceiver device 400 may use the service platform provider public key provided by the service platform provider public key certificate ("X.509OEM PUB") 606 in the TPM device 406 to verify the service platform public key ("$SERV.PLAT_{PUB}$") included in the service-platform-provider-private-key-signed service platform public key ("$X.509_{OEM\ PRIV}(SERV.PLAT_{PUB})$") 604 in the "RESPONSE" section of the user-defined page 408a in the storage device 408 in order to produce a verified service platform public key. As will be appreciated by one of skill in the art in possession of the present disclosure, the service platform provider public key certificate ("$X.509_{OEM\ PUB}$") 606 verifies to the transceiver engine 404 that the service platform provider public key provided therein belongs to the service platform provider, and that service platform provider public key may then be used by the transceiver engine 404 to verify that the service platform public key ("$SERV.PLAT_{PUB}$") is authentic via the confirmation that it was signed by the service platform provider using the service platform provider private key.

The method 700 then proceeds to block 714 where the transceiver device uses the verified service platform public key to decrypt the encrypted challenge information to produce decrypted challenge information. In an embodiment, at block 714, the transceiver engine 404 in the transceiver device 400 may use the service platform public key ("$SERV.PLAT_{PUB}$") to decrypt the encrypted challenge information ("$E_{SERV.PLAT\ PRIV}$(LOCK, NONCE)") to produce decrypted challenge information ("$D_{SERV.PLAT\ PRIV}$(LOCK, NONCE)").

The method 700 then proceeds to block 716 where the transceiver device determines that the decrypted challenge information matches the challenge information. In an embodiment, at block 716, the transceiver engine 404 in the transceiver device 400 may determine whether the decrypted challenge information ("$D_{SERV.PLAT\ PRIV}$(LOCK, NONCE)") and, in particular, the decrypted cryptographic nonce, matches the challenge information/cryptographic nonce generated at block 704. While the method 700 presumes such a match, one of skill in the art in possession of the present disclosure will appreciate how a mismatch between the decrypted challenge information and the challenge information generated at block 704 may cause the data communications operations of the transceiver device 400 to remain disabled.

Figure 12:
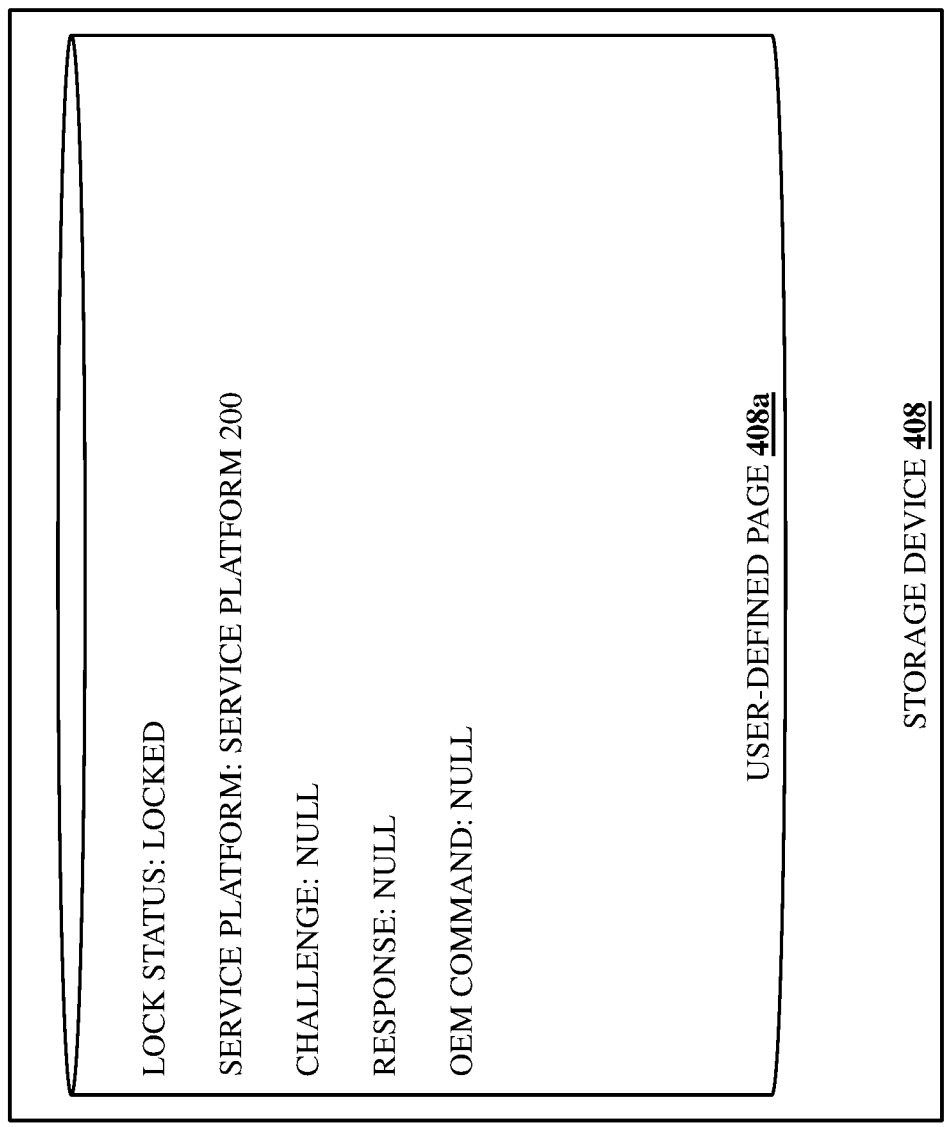
FIG. 12 is a schematic view illustrating an embodiment of the user-defined page in the storage device of FIG. 4B during the method of FIG. 7.

The method 700 then proceeds to block 718 where the transceiver device enables data communication operations and locks the transceiver device to operate with a service platform. In an embodiment, at block 718 and in response to determining at block 716 that the decrypted challenge information and the challenge information generated at block 704 match, the transceiver engine 404 in the transceiver device 400 may identify the lock command included in the decrypted challenge information and, in response, enable data communication operations (i.e., the sending and receiving of data) for the transceiver device 400, and lock the transceiver device to operate with the service platform 200 that is provided by the platform device 300 and that is associated with the service platform public key. With reference to FIG. 12, in response to locking the transceiver device 400 to operate with the service platform 200 provided by the platform device 300, the transceiver engine 404 may provide the "LOCK STATUS" section of the user-defined page 408a in the storage device 408 of the transceiver device 400 with a locked status for the transceiver device 400 (e.g., "LOCKED" in the illustrated embodiment), and may provide the "SERVICE PLATFORM" section of the user-defined page 408a in the storage device 408 of the transceiver device 400 with the service platform tag/identifier for the service platform 200 provided by the platform device 300 (e.g., "SERVICE PLATFORM 200" in the illustrated embodiment).

Figure 13:
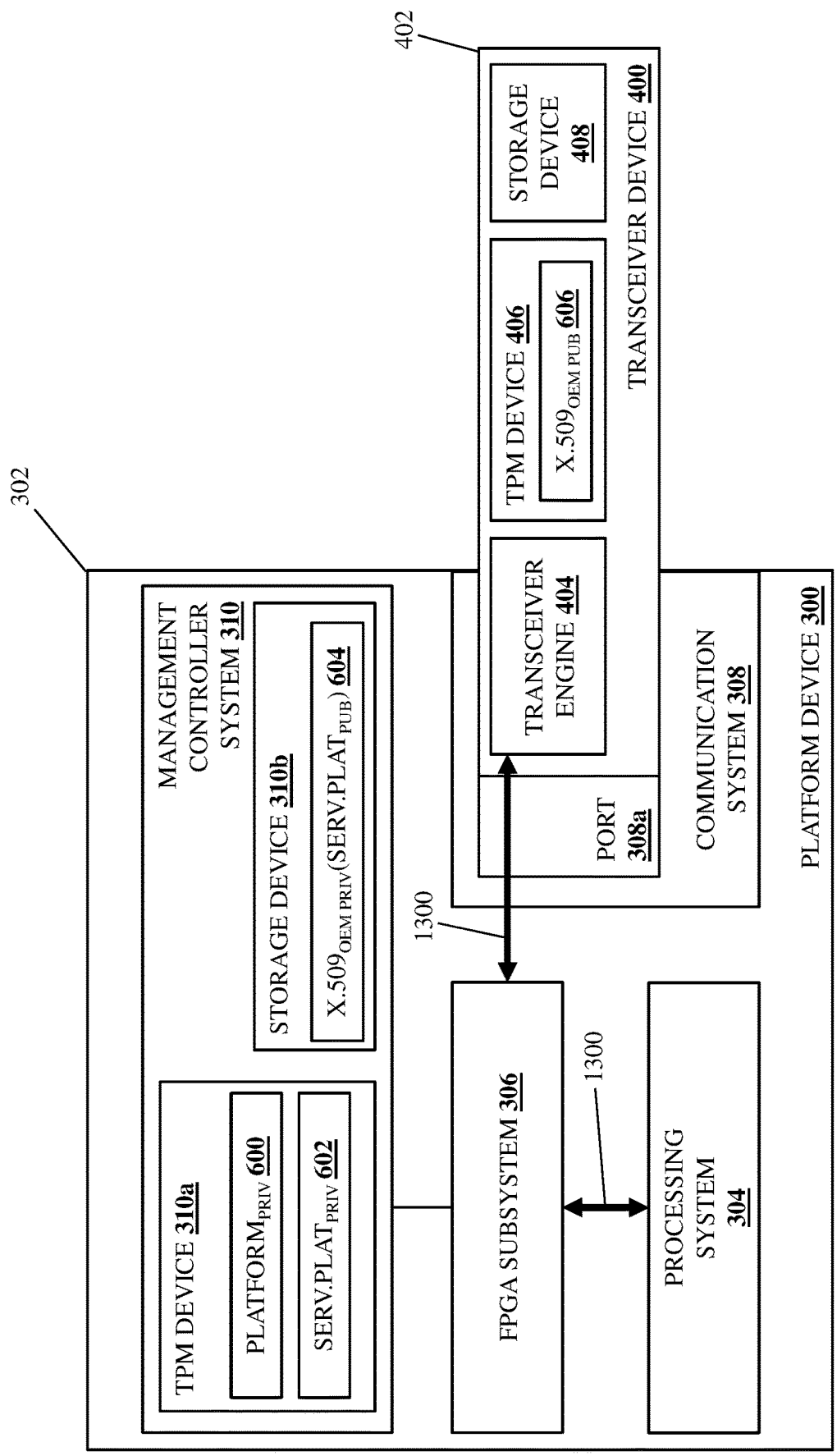
FIG. 13 is a schematic view illustrating an embodiment of the transceiver device and platform device of FIG. 8 operating during the method of FIG. 7.

With reference to FIG. 13, a NOS provided by the processing system 304 may then perform any of a variety of data communication operations 1300 via the FPGA subsystem 306 and using the transceiver device 400. As such, subsequent to block 718 of the method 700, the transceiver device 400 has its data communication operations enabled, is locked to operate with platform devices 202, 204, and 206 that provide the service platform 200, and the sections of the user-defined page 408a in the storage device 408 of the transceiver device 400 may be read-only for the management controller system 310 in the platform device 300.

Figure 14:
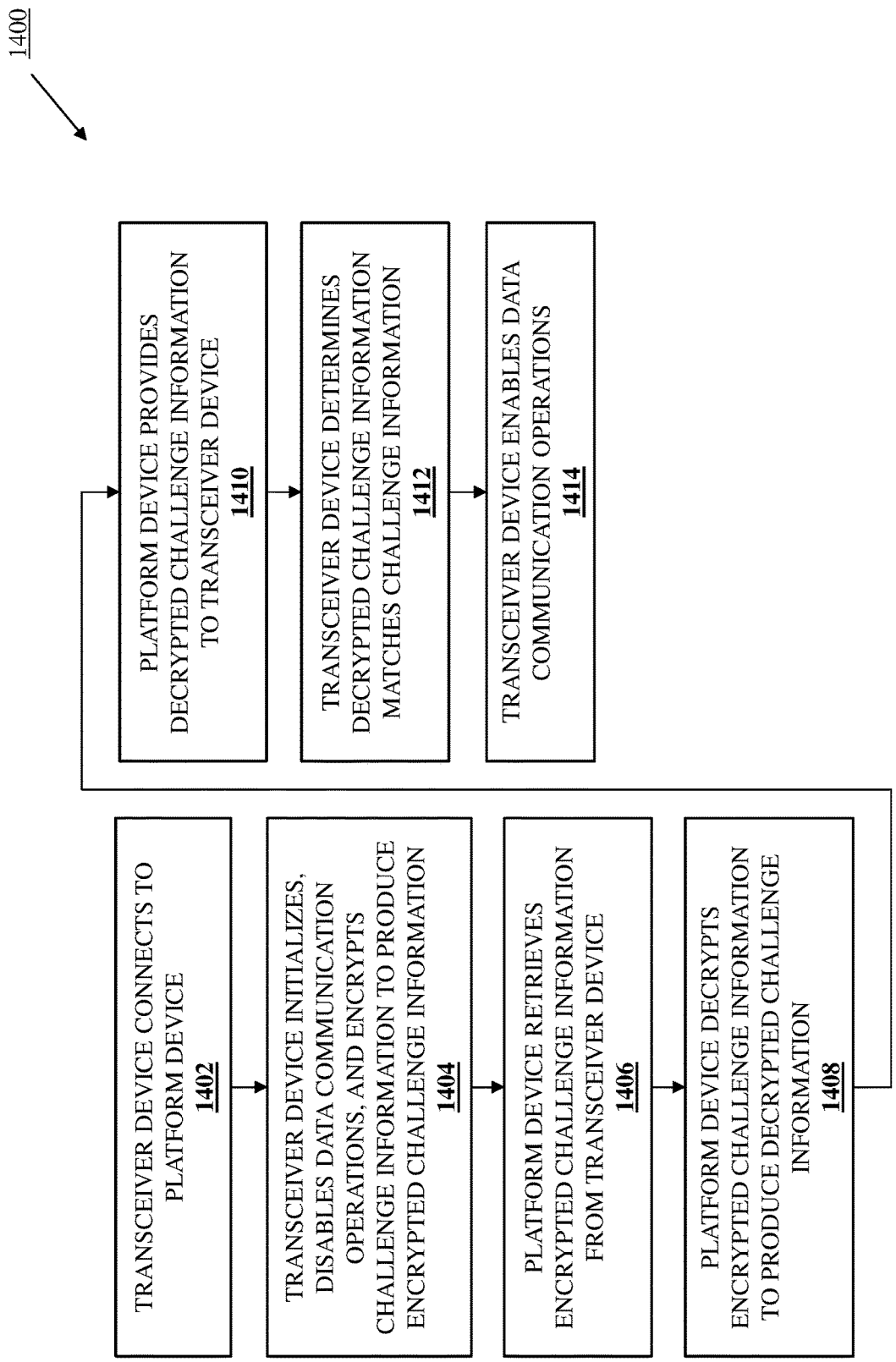
FIG. 14 is a flow chart illustrating an embodiment of a method for operating a transceiver device that is locked with a service platform provided by a platform device.

Referring now to FIG. 14, an embodiment of a method 1400 for operating a transceiver device that is locked with a service platform provided by a platform device is illustrated. As discussed below, the systems and methods of the present disclosure provide for the ability to use a transceiver device that has been previously locked to operate with a service platform with any platform device that provides that service platform. As discussed below, the systems and methods of the present disclosure allow a transceiver device that has been locked to a service platform provided by platform devices to disable data communication operations on any subsequent initialization, present an encrypted challenge to the platform device it has been connected to, determine whether that platform device is part of the service platform to which it was locked and, if so, enable data communication operations to operate with that platform device.

The method 1400 begins at block 1402 where a transceiver device connects to a platform device. With reference back to FIG. 8, in an embodiment of block 1402 and similarly as discussed above, the transceiver device 400 may be connected to the platform device 300 subsequent to having been locked to operate with the service platform 200 provided by platform devices that include the platform device 300. As will be appreciated by one of skill in the art in possession of the present disclosure, the platform device 300 to which the transceiver device 400 is connected in the method 1400 may be different than the platform device 300 to which the transceiver device 400 was connected to during the method 700. However, one of skill in the art in possession of the present disclosure will appreciate how the platform device 300 to which the transceiver device 400 is connected in the method 1400 may be the same as the platform device 300 to which the transceiver device 400 was connected to during the method 700 when, for example, the transceiver device 400 is disconnected from the platform device 300 following the method 700, and then reconnected to that platform device 300 to perform the method 1400.

The method 1400 then proceeds to block 1404 where the transceiver device initializes, disables data communication operations, and encrypts challenge information to produce encrypted challenge information. In an embodiment, at block 1404, the transceiver device 400 may power on or otherwise initialize. For example, following the connection of the transceiver device 400 to the platform device 300, the platform device 300 may be powered on and/or otherwise initialized and, in response, provide power to the transceiver device 400 in order to allow the transceiver device 400 to power on or otherwise initialize. However, in other embodiments, the transceiver device 400 may be connected to powered on or otherwise initialized platform device 300 and, in response, may power on or otherwise initialize. In a specific example, the initialization of the transceiver device 400 may include the booting or other initialization of transceiver firmware in the transceiver device 400 that provides at least some of the functionality of the transceiver engine 404.

Figure 15:
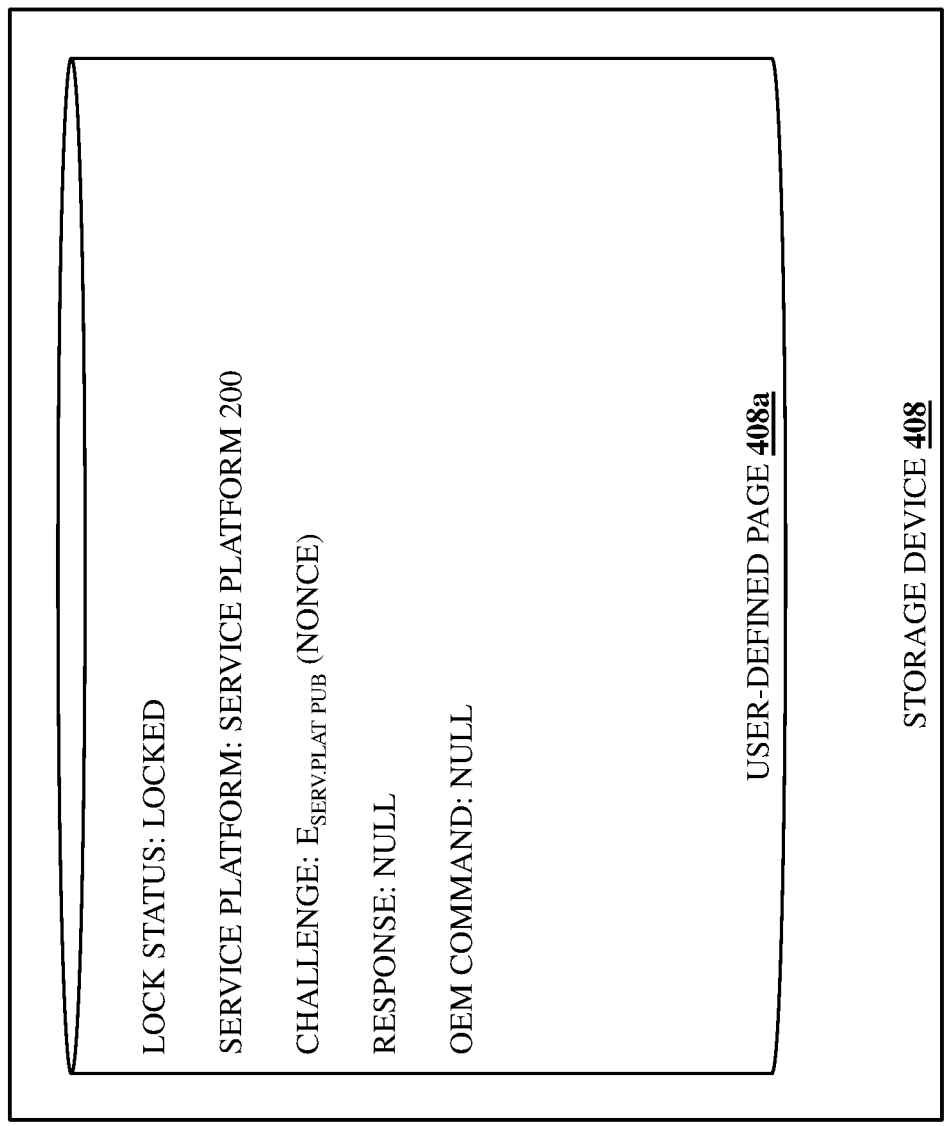
FIG. 15 is a schematic view illustrating an embodiment of the user-defined page in the storage device of FIG. 4B during the method of FIG. 14.

At block 1404, in response to powering on or otherwise initializing, the transceiver engine 404 in the transceiver device 400 may perform data communication disabling operations that include disabling the ability of the transceiver device 400 to send or receive data communications using any of a variety of data communication disabling techniques that would be apparent to one of skill in the art in possession of the present disclosure. With reference to FIG. 15, as discussed above, in response to having been locked to operate with the service platform 200, the transceiver engine 404 may have previously provided the "LOCK STATUS" section of the user-defined page 408a in the storage device 408 of the transceiver device 400 with a locked status for the transceiver device 400 (e.g., "LOCKED" in the illustrated embodiment), as well as provided the "SERVICE PLATFORM" section of the user-defined page 408a in the storage device 408 of the transceiver device 400 with the service platform tag/identifier for the service platform to which the transceiver device 400 is locked (e.g., "SERVICE PLATFORM 200" in the illustrated embodiment). Furthermore, at block 1404, the transceiver engine 404 may also perform challenge information encryption operations to generate encrypted challenge information. For example, the challenge information encryption operations may include generating a cryptographic nonce or other challenge information known in the art, using a service platform public key ("SERV.PLAT$_{PUB}$") to encrypt the cryptographic nonce to produce an encrypted cryptographic nonce, and providing that encrypted cryptographic nonce in the "CHALLENGE" section of the user-defined page 408a in the storage device 408 of the transceiver device 400 (e.g., "E$_{SERV.PLAT\ PUB}$(NONCE)" in the illustrated embodiment).

Figure 16:
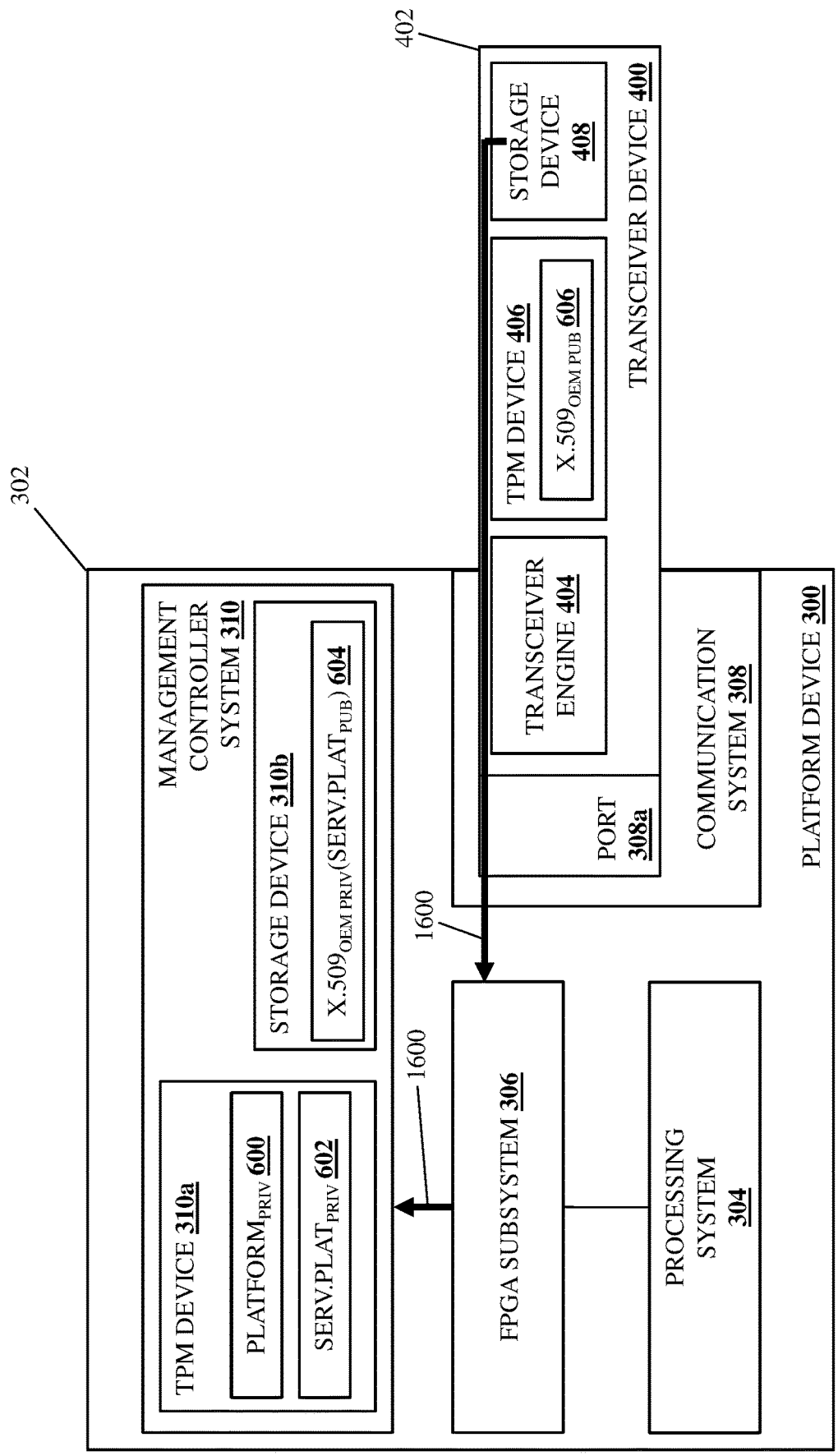
FIG. 16 is a schematic view illustrating an embodiment of the transceiver device and platform device of FIG. 8 operating during the method of FIG. 14.

The method 1400 then proceeds to block 1406 where the platform device retrieves the encrypted challenge information from the transceiver device. With reference to FIG. 16, in an embodiment of block 1406, the management controller system 310 in the platform device 300 may perform encrypted challenge information retrieval operations 1600 that may include accessing the storage device 408 in the transceiver device 400 (e.g., directly, through the transceiver engine 404, etc.) via the FPGA subsystem 306, and retrieving the encrypted challenge information from the "CHALLENGE" section of the user-defined page 408a in the storage device 408 of the transceiver device 400. For example, in response to initialization of the transceiver device 400, the management controller device 310 may detect the transceiver device 400 connected to the port 308a (e.g., based on a ModPrsL/interrupt signal) and, in response, may read an EEPROM in the transceiver device 400 that provides the storage device 408 and determine that the transceiver device 400 includes the locked status (i.e., based on "LOCKED" being provided in the "LOCK STATUS" section of the user-defined page 408a in the storage device 408 of the transceiver device 400). In response to determining that the transceiver device 400 includes the locked status, the management controller device 310 may retrieve the encrypted cryptographic nonce or other challenge information from the "CHALLENGE" section of the user-defined page 408a in the storage device 408 of the transceiver device 400.

The method 1400 then proceeds to block 1408 where the platform device decrypts the encrypted challenge information to produce decrypted challenge information. In an embodiment, at block 1408, the management controller system 310 in the platform device 300 may use the service platform private key ("SERV.PLAT$_{PRIV}$") 602 stored in the TPM device 310a to decrypt the encrypted challenge information ("E$_{SERV.PLAT\ PUB}$(NONCE)") that was retrieved from the transceiver device 400 to produce decrypted challenge information. For example, at block 1408, management controller system 310 may use the service platform private key to decrypt the encrypted cryptographic nonce or other challenge information to produce decrypted challenge information ("D$_{SERV.PLAT\ PRIV}$(NONCE)").

Figure 17A:
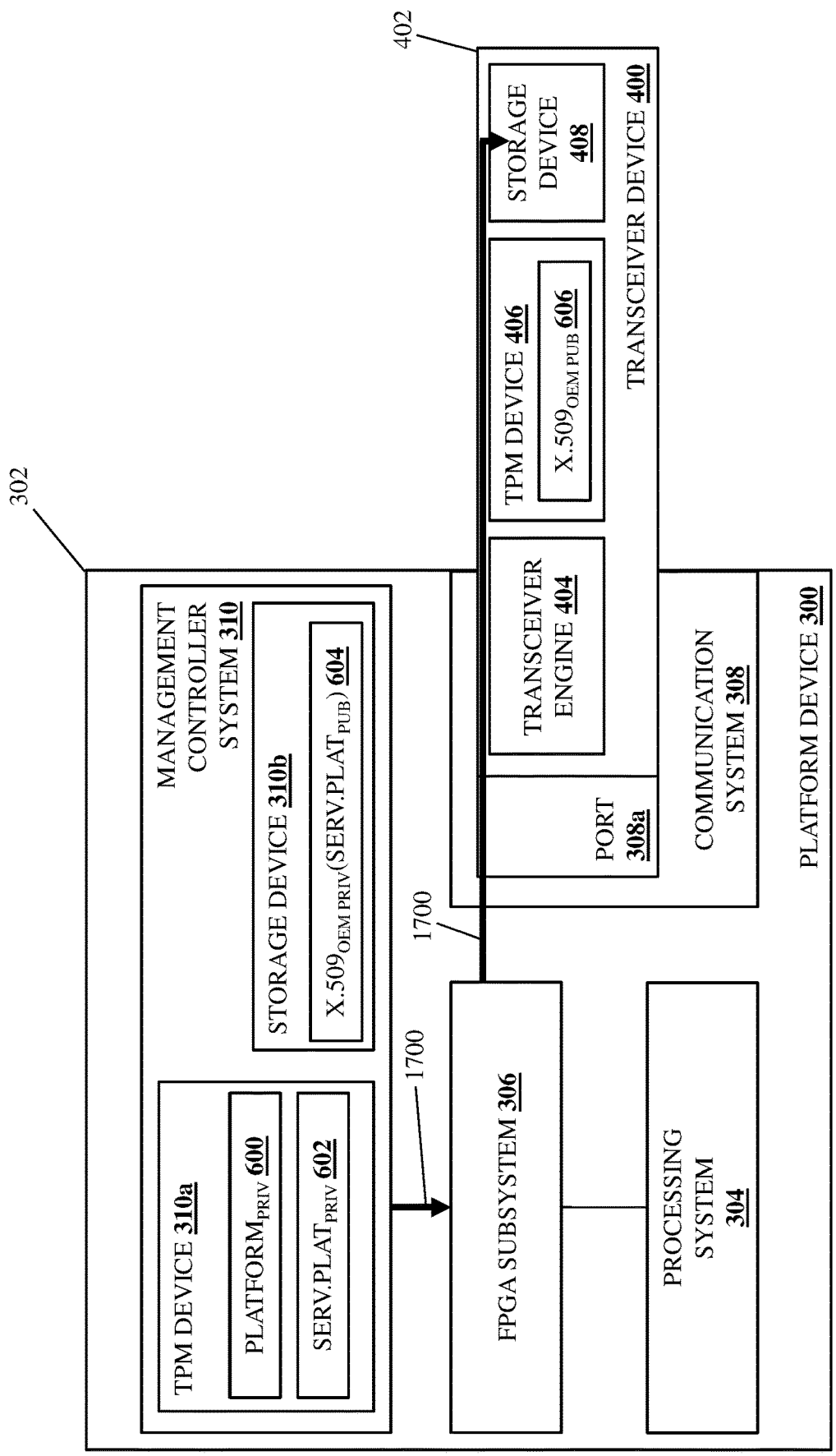
FIG. 17A is a schematic view illustrating an embodiment of the transceiver device and platform device of FIG. 8 operating during the method of FIG. 14.
Figure 17B:
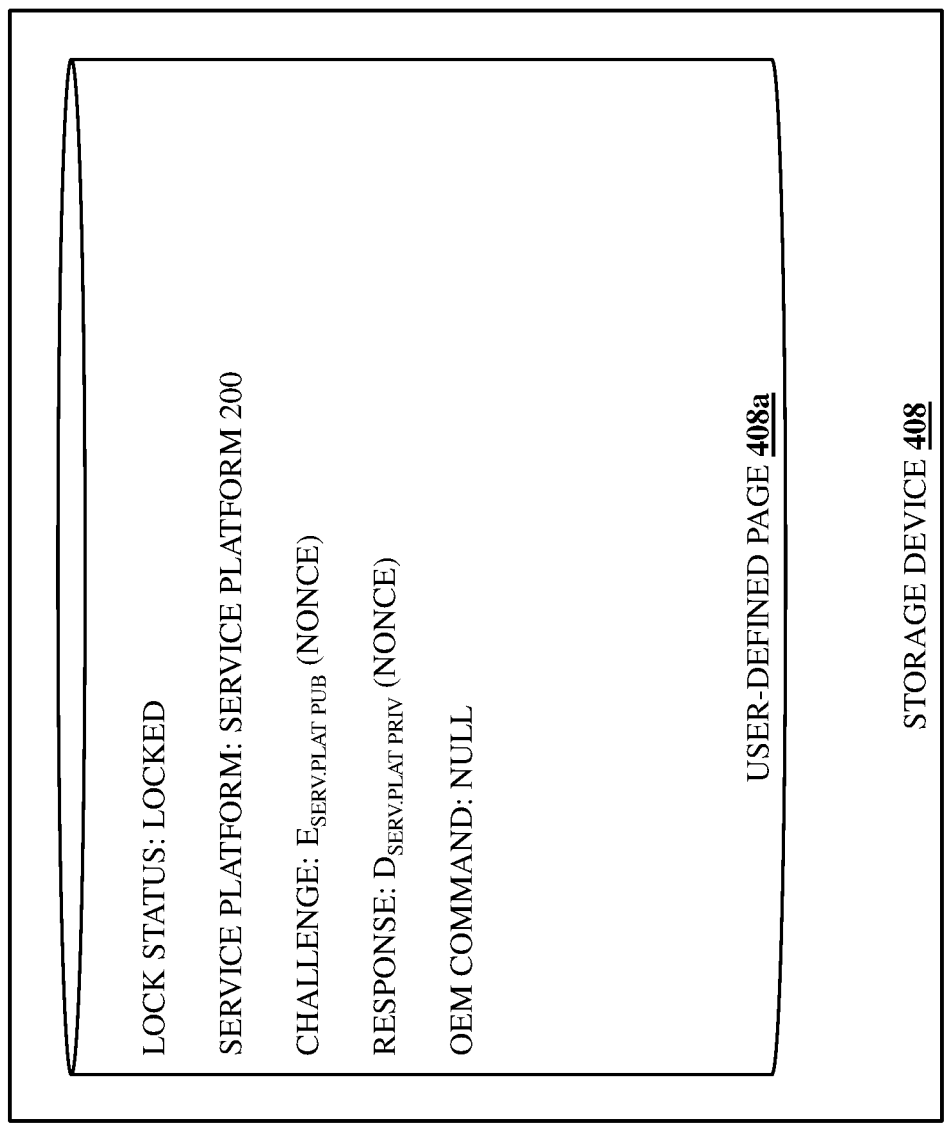
FIG. 17B is a schematic view illustrating an embodiment of the user-defined page in the storage device of FIG. 4B during the method of FIG. 14.

The method 1400 then proceeds to block 1410 where the platform device provides the decrypted challenge information to the transceiver device. With reference to FIGS. 17A and 17B, in an embodiment in an embodiment of block 1410, the management controller system 310 in the platform device 300 may perform decrypted challenge information provisioning operations 1700 that may include accessing the storage device 408 in the transceiver device 400 (e.g., directly, through the transceiver engine 404, etc.) via the FPGA subsystem 306, and providing the decrypted challenge information ("D$_{SERV.PLAT\ PRIV}$ (NONCE)") in the "RESPONSE" section of the user-defined page 408a in the storage device 408 of the transceiver device 400.

The method 1400 then proceeds to block 1412 where the transceiver device determines that the decrypted challenge information matches the challenge information. In an embodiment, at block 1412, the transceiver engine 404 in the transceiver device 400 may determine whether the decrypted challenge information/cryptographic nonce ("D$_{SERV.PLAT\ PRIV}$ (NONCE)") matches the challenge information/cryptographic nonce used to generate the encrypted challenge information at block 1404. While the method 1400 presumes such a match, one of skill in the art in possession of the present disclosure will appreciate how a mismatch between the decrypted challenge information and the challenge information used to generate the encrypted challenge information at block 1404 may cause the data communications operations of the transceiver device 400 to remain disabled.

Figure 18:
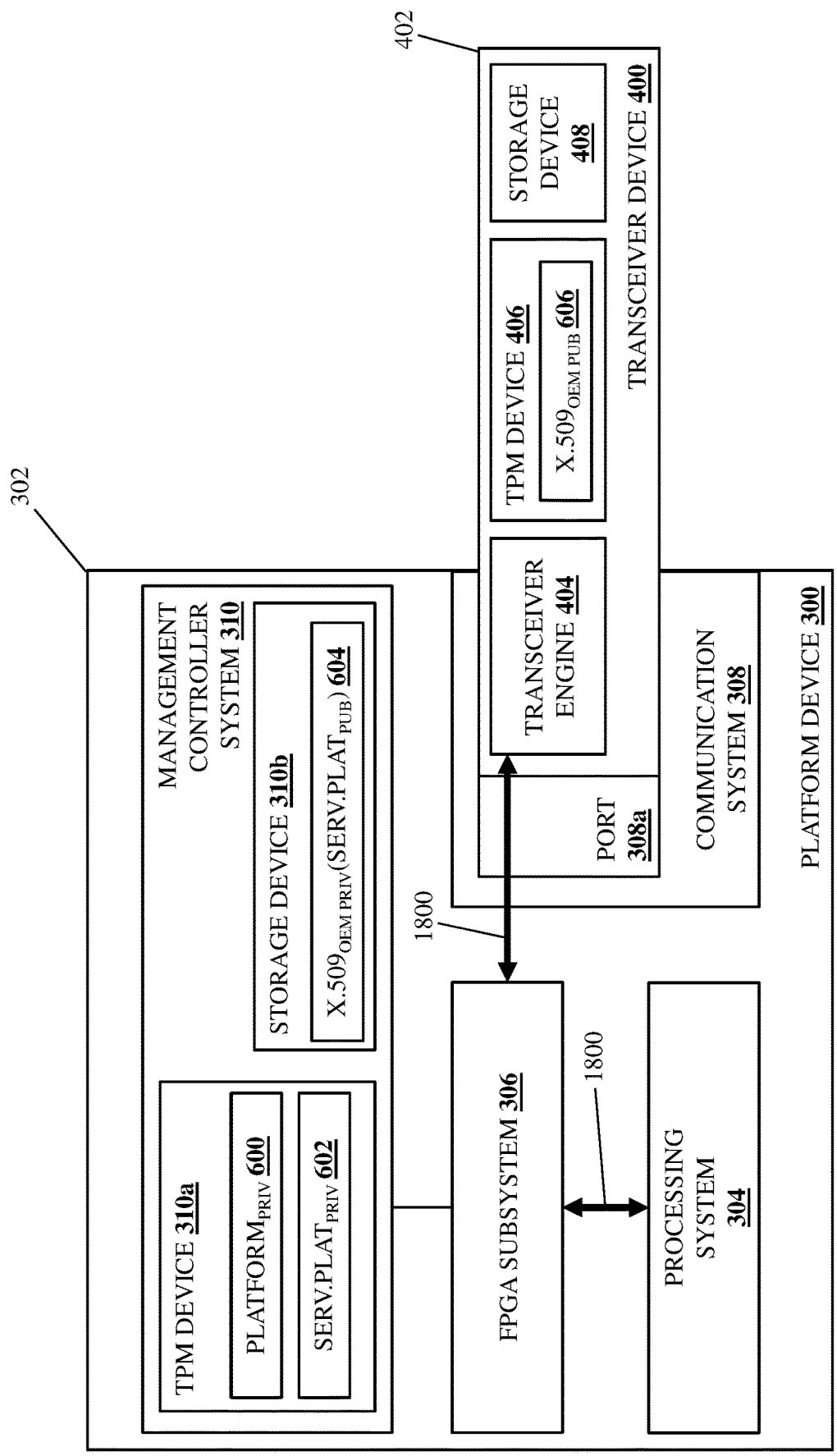
FIG. 18 is a schematic view illustrating an embodiment of the transceiver device and platform device of FIG. 8 operating during the method of FIG. 14.

The method 1400 then proceeds to block 1414 where the transceiver device enables data communication operations. In an embodiment, at block 1414 and in response to determining at block 1412 that the decrypted challenge information and the challenge information used to generate the encrypted challenge information at block 1404 match, the transceiver engine 404 in the transceiver device 400 may enable data communication operations (i.e., the sending and receiving of data) for the transceiver device 400. With reference to FIG. 18, a NOS provided by the processing system 304 may then perform any of a variety of data communication operations 1800 via the FPGA subsystem 306 and using the transceiver device 400. As such, subsequent to block 1414 of the method 800, the transceiver device 400 has data communication operations enabled, continues to be locked to operate with platform devices that provide the service platform 200, and the sections of the user-defined page 408a in the storage device 408 of the transceiver device 400 may be read-only for the management controller system 310 in the platform device 300.

Referring now to FIG. 18, an embodiment of a method 1800 for unlocking a transceiver device from operating with a service platform provided by a platform device is illustrated. As discussed below, the systems and methods of the present disclosure provide the ability to unlock a transceiver device that was previously locked to operate with a service platform provided by platform devices, thus enabling the transceiver device to operate with devices that are not providing the service platform. For example, the transceiver device that was previously locked to a service platform may receive an encrypted unlock command from a service platform provider, decrypt that encrypted unlock command to retrieve an unlock command and, in response, unlock the transceiver device from operating with the service platform. As discussed above, some embodiments of the present disclosure envision the transceiver device as being provided at a discounted price that is contingent on its use with the service platform, and the encrypted unlock command from the service platform provider may be obtained at the expense of that discount in the event a user wishes to use a transceiver device, which was previously purchased at a discount and as part of a service platform, with devices that are not included in that service platform.

The method 1800 begins at block 1802 where a transceiver device receives an encrypted unlock command. As discussed above, a user of the transceiver device 400 that wishes to unlock that transceiver device 400 from the service platform 200 may request the encrypted unlock command from the service platform provider. In a specific example, the service platform provider may then use the service platform private key ("SERV.PLAT$_{PRIV}$") to encrypt an unlock command ("UNLOCK") and a transceiver device identifier such as a serial number ("SN$_{TRANSCEIVER}$") in order to produce a partially encrypted unlock command ("E$_{SERV.PLAT\ PRIV}$(UNLOCK, SN$_{TRANSCEIVER}$)"). The service platform provider may then use a service platform provider private key ("OEM$_{PRIV}$") to encrypt the partially encrypted unlock command to produce the encrypted unlock command ("E$_{OEM\ PRIV}$(E$_{SERV.PLAT\ PRIV}$(UNLOCK, SN$_{TRANSCEIVER}$))") and provide that encrypted unlock command to the management controller system 310 in the platform device 300.

Figure 20A:
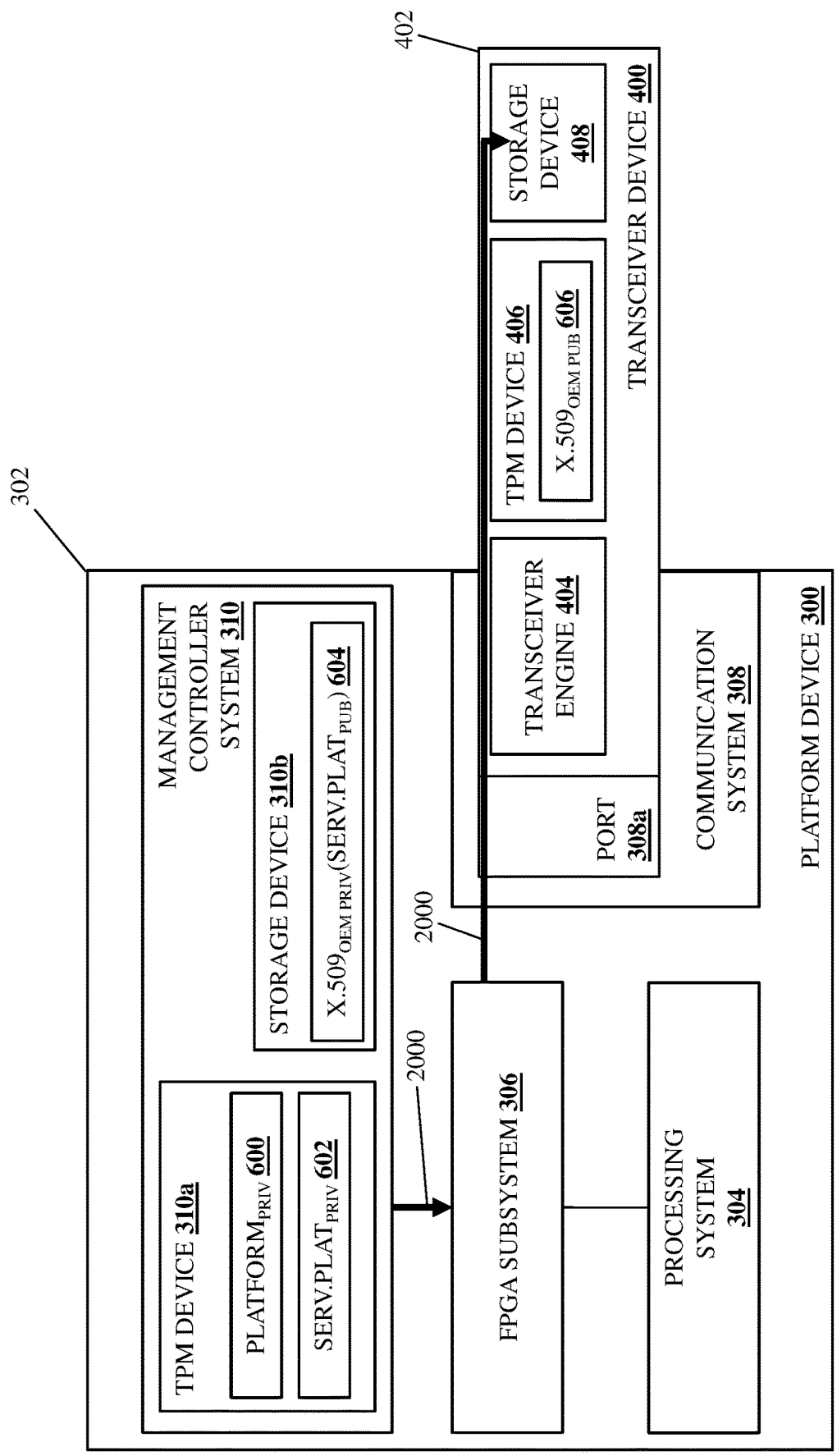
FIG. 20A is a schematic view illustrating an embodiment of the transceiver device and platform device of FIG. 8 operating during the method of FIG. 19.
Figure 20B:
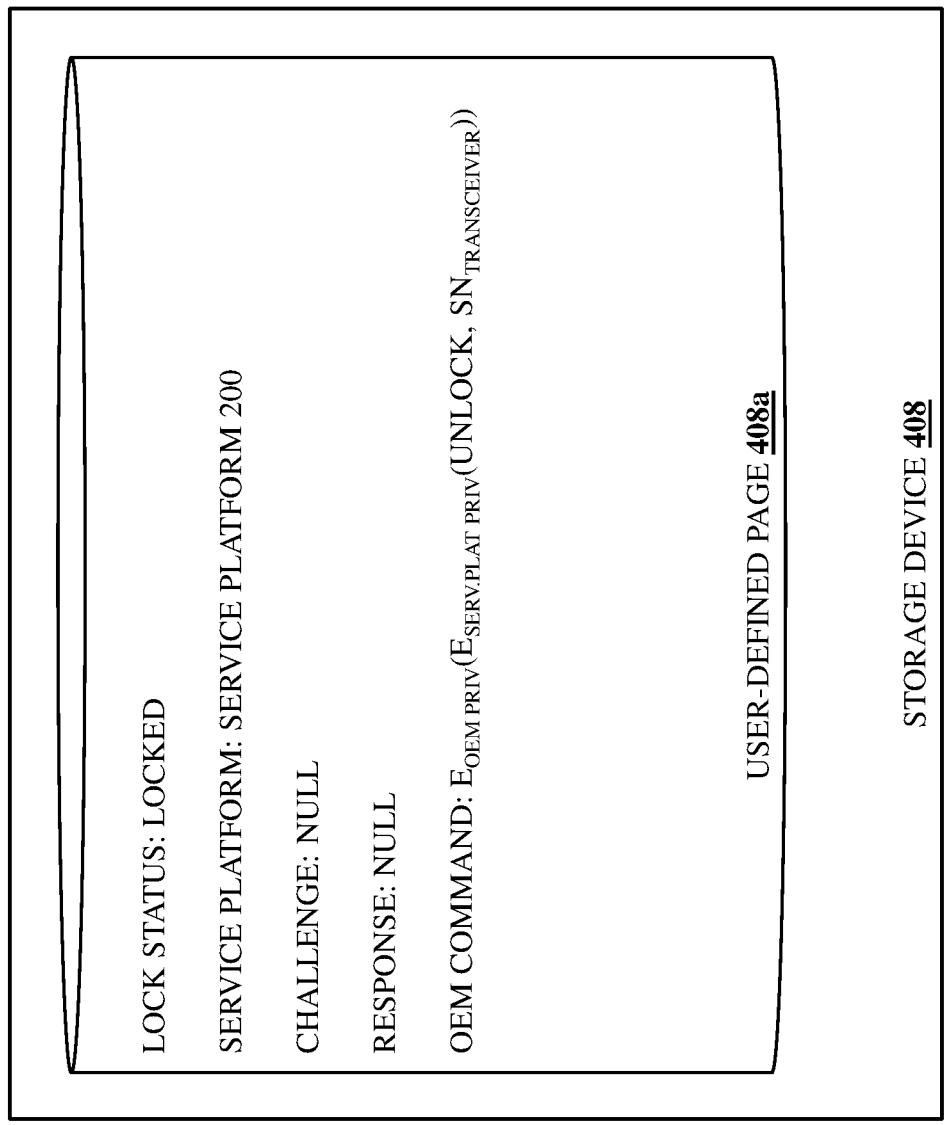
FIG. 20B is a schematic view illustrating an embodiment of the user-defined page in the storage device of FIG. 4B during the method of FIG. 19.

With reference to FIGS. 20A and 20B, in an embodiment of block 1802, the management controller system 310 in the platform device 300 may then perform encrypted unlock command provisioning operations 2000 that may include accessing the storage device 408 in the transceiver device 400 (e.g., directly, through the transceiver engine 404, etc.) via the FPGA subsystem 306, and providing the encrypted unlock command ("E$_{OEM\ PRIV}$(E$_{SERV.PLAT\ PRIV}$(UNLOCK, SN$_{TRANSCEIVER}$))") in the "OEM COMMAND" section of the user-defined page 408a in the storage device 408 of the transceiver device 400.

The method 1800 then proceeds to block 1804 where the transceiver device uses a service platform provider public key to decrypt the encrypted unlock command and produce a partially decrypted unlock command. In an embodiment, at block 1804, the transceiver engine 404 in the transceiver device 400 may use a service platform provider public key ("OEM$_{PUB}$") to decrypt the encrypted unlock command ("E$_{OEM\ PRIV}$(E$_{SERV.PLAT\ PRIV}$(UNLOCK, SN$_{TRANSCEIVER}$))") and produce a partially decrypted unlock command ("E$_{SERV.PLAT\ PRIV}$(UNLOCK, SN$_{TRANSCEIVER}$)"). The method 1800 then proceeds to block 1806 where the transceiver device uses a service platform public key to decrypt the partially decrypted unlock command and retrieve an unlock command. In an embodiment, at block 1806, the transceiver engine 404 in the transceiver device 400 may use a service platform public key ("SERV.PLAT$_{PUB}$") to decrypt the partially decrypted unlock command ("E$_{SERV.PLAT\ PRIV}$(UNLOCK, SN$_{TRANSCEIVER}$)") and retrieve an unlock command ("UNLOCK") and a transceiver device identifier such as a serial number ("SN$_{TRANSCEIVER}$").

Figure 21:
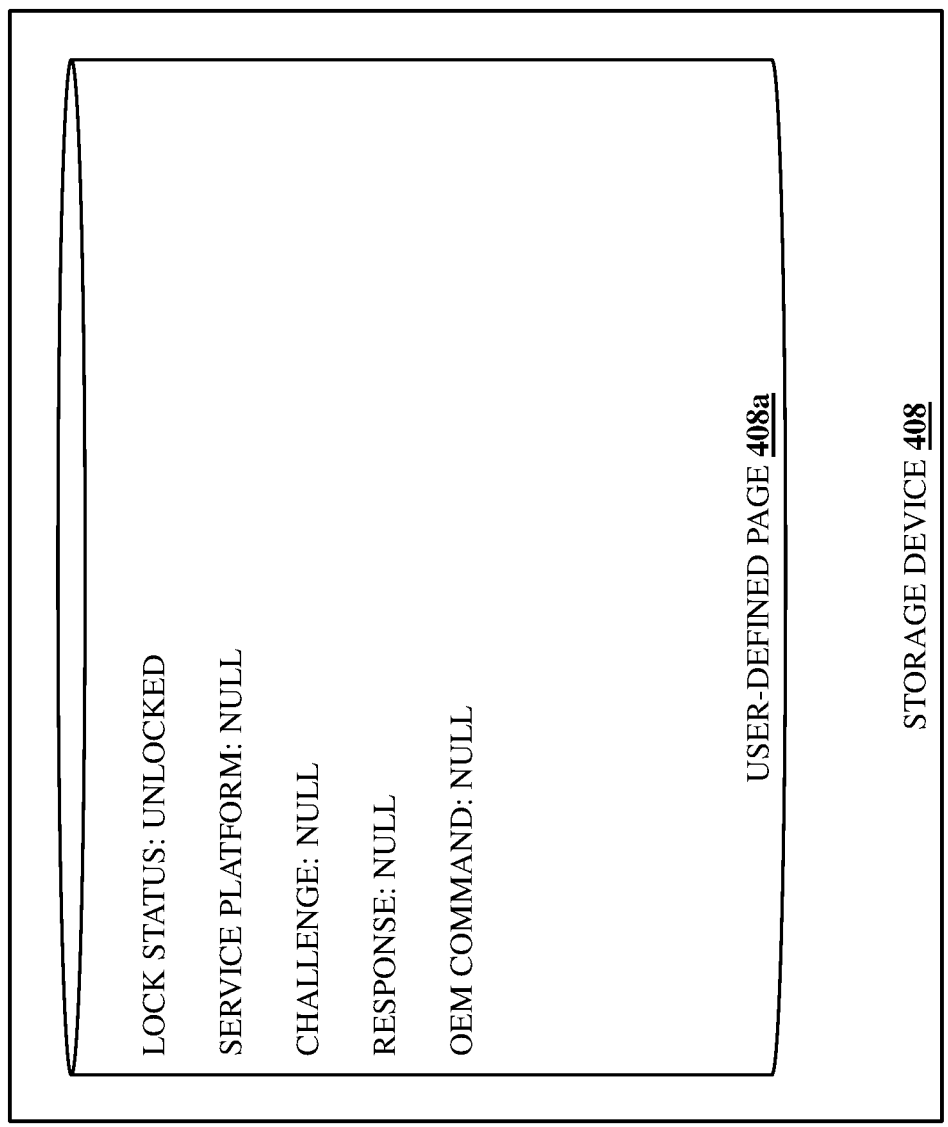
FIG. 21 is a schematic view illustrating an embodiment of the user-defined page in the storage device of FIG. 4B during the method of FIG. 19.

The method 1800 then proceeds to block 1808 where the transceiver device unlocks the transceiver device from operating with the service platform. With reference to FIG. 21, in an embodiment of block 1808, the transceiver engine 404 in the transceiver device 400 may determine whether the transceiver device identifier such as the serial number ("SN$_{TRANSCEIVER}$") matches the transceiver device 400 and, if so, may provide an unlocked status in the "CHALLENGE" section of the user-defined page 408a in the storage device 408 of the transceiver device 400 (e.g., "UNLOCKED" in the illustrated embodiment). As will be appreciated by one of skill in the art in possession of the present disclosure, in the event the transceiver device identifier such as the serial number ("SN$_{TRANSCEIVER}$") does not match the transceiver device 400, the transceiver device 400 may remain locked to the service platform 200. Following successful unlocking of the transceiver device 400 at block 1808, subsequent initializations of the transceiver device 400 will not result in any challenges to any device to which it is connected.

Thus, systems and methods have been described that provide for the locking of a transceiver device to a service platform provided by platform devices during a first initialization/power up of that transceiver device in one of those platform devices, thus preventing subsequent use of that transceiver device with a device that is not included in the service platform. For example, the service platform/transceiver device locking system of the present disclosure may include a transceiver device that disables its data communication operations during an initialization operation and generates challenge information, and a platform device that retrieves that challenge information. The platform device uses a service platform private key to encrypt the challenge information, and provides the encrypted challenge information, and a service-platform-provider-private-key-signed service platform public key to the transceiver device. The transceiver device uses a service platform provider public key to verify a service platform public key in the service-platform-provider-private-key-signed service platform public key to produce a verified service platform public key that it uses to decrypt the encrypted challenge information to produce decrypted challenge information. If the transceiver device determines that the decrypted challenge information matches the challenge information, it enables its data communication operations and locks itself to operate with a service platform associated with the service platform public/private keys. As such, transceiver devices may be provided with service platforms at reduced cost contingent on their use with only platform devices that are part of the service platform, but may be enabled to operate with devices that are not part of that service platform for a subsequent fee.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A service platform/transceiver device locking system, comprising:
a transceiver device that is configured to:
  disable, during a first initialization operation, data communication operations for the transceiver device; and
  generate challenge information; and
a first platform device of one or more platform devices that are included in a service platform, wherein the first platform device is configured, in response to determining that the transceiver device is connected to the first platform device, to:
  retrieve, from the transceiver device, the challenge information;
  encrypt, using a service platform private key for the service platform, the challenge information to produce encrypted challenge information; and
  provide, to the transceiver device, the encrypted challenge information and a service-platform-provider-private-key-signed service platform public key,
wherein the transceiver device is configured to:
  verify, using a service platform provider public key, a service platform public key for the service platform that is included in the service-platform-provider-private-key-signed service platform public key to produce a verified service platform public key;
  decrypt, using the verified service platform public key, the encrypted challenge information to produce decrypted challenge information;
  determine that the decrypted challenge information matches the challenge information and, in response:
    enable data communication operations for the transceiver device; and
    lock the transceiver device to operate with the service platform such that the transceiver device is prevented from operating with platform devices that are not included in the service platform.

2. The system of claim 1, wherein the transceiver device is configured to:
set, during the first initialization operation, a lock-wait status for the transceiver device; and
set, in response to determining that the decrypted challenge information matches the challenge information, a lock status for the transceiver device.

3. The system of claim 1, wherein the first platform device is configured to:
encrypt, using the service platform private key for the service platform, the challenge information and a lock command to produce the encrypted challenge information,
and wherein the transceiver device is configured to:
decrypt, using the verified service platform public key, the encrypted challenge information to produce the lock command.

4. The system of claim 1, wherein the transceiver device is configured, during a second initialization operation that is subsequent to the first initialization operation, to:
disable data communication operations for the transceiver device; and
encrypt, using the service platform public key for the service platform, the challenge information to produce encrypted challenge information, and wherein the system further comprises:
  a second platform device of the one or more platform devices that are included in the service platform, wherein the second platform device is configured, in response to determining that the transceiver device is connected to the second platform device, to:
    retrieve, from the transceiver device, the encrypted challenge information;
    decrypt, using the service platform private key for the service platform, the encrypted challenge information to produce decrypted challenge information; and
    provide, to the transceiver device, the decrypted challenge information, wherein the transceiver device is configured to:
      determine whether the decrypted challenge information matches the challenge information; and
    enable, in response to determining that the decrypted challenge information matches the challenge information, data communication operations for the transceiver device.

5. The system of claim 1, wherein the transceiver device is configured to:
receive an encrypted unlock command;
decrypt, using the service platform provider public key, the encrypted unlock command to produce an unlock command;
unlock, in response to retrieving the unlock command, the transceiver device from operating with the service platform.

6. The system of claim 5, wherein the transceiver device is configured to:
decrypt, using the service platform public key for the service platform, the encrypted unlock command to produce a partially encrypted unlock command; and
decrypt, using the service platform provider public key for the service platform, the partially encrypted unlock command to produce the unlock command.

7. The system of claim 5, wherein the unlock command includes a transceiver device identifier, and wherein the transceiver device is configured to:
verify that the transceiver device identifier included in the unlock command corresponds to the transceiver device and, in response, unlock the transceiver device from the service platform such that the transceiver device is allowed to operate with platform devices that are not included in the service platform.

8. A transceiver Information Handling System (IHS), comprising:
a processing system; and
a memory system that is coupled to the processing system and that includes instructions that, when executed by the processing system, cause the processing system to provide a transceiver engine that is configured to:
disable, during a first initialization operation following connection to a first platform device of one or more platform devices that are included in a service platform, data communication operations for the transceiver IHS;
generate challenge information;
receive, from the first platform device, encrypted challenge information and a service-platform-provider-private-key-signed service platform public key;
verify, using a service platform provider public key, a service platform public key for the service platform that is included in the service-platform-provider-private-key-signed service platform public key to produce a verified service platform public key;
decrypt, using the verified service platform public key, the encrypted challenge information to produce decrypted challenge information;
determine that the decrypted challenge information matches the challenge information and, in response:
enable data communication operations for the transceiver IHS; and
lock the transceiver IHS to operate with the service platform such that the transceiver device is prevented from operating with platform devices that are not included in the service platform.

9. The IHS of claim 8, wherein the transceiver engine is configured to:
set, during the first initialization operation, a lock-wait status for the transceiver IHS; and
set, in response to determining that the decrypted challenge information matches the challenge information, a lock status for the transceiver IHS.

10. The IHS of claim 8, wherein the transceiver engine is configured to:
decrypt, using the verified service platform public key, the encrypted challenge information to produce a lock command.

11. The IHS of claim 8, wherein the transceiver engine is configured to:
disable, during a second initialization operation following connection to a second platform device of the one or more platform devices that are included in the service platform, data communication operations for the transceiver IHS;
encrypt, using the service platform public key for the service platform, the challenge information to produce encrypted challenge information;
receive, from the second platform device, decrypted challenge information;
determine whether the decrypted challenge information matches the challenge information; and
enable, in response to determining that the decrypted challenge information matches the challenge information, data communication operations for the transceiver IHS.

12. The IHS of claim 8, wherein the transceiver engine is configured to:
receive an encrypted unlock command;
decrypt, using the service platform provider public key, the encrypted unlock command to produce an unlock command;
unlock, in response to retrieving the unlock command, the transceiver IHS from operating with the service platform such that the transceiver IHS is allowed to operate with platform devices that are not included in the service platform.

13. The IHS of claim 12, wherein the unlock command includes a transceiver device identifier, and wherein the transceiver engine is configured to:
verify that the transceiver device identifier included in the unlock command corresponds to the transceiver IHS and, in response, unlock the transceiver IHS from operating with the service platform such that the transceiver IHS is allowed to operate with platform devices that are not included in the service platform.

14. A method for locking a transceiver device to operate with a service platform, comprising:
disabling, by a transceiver device during a first initialization operation following connection to a first platform device of one or more platform devices that are included in a service platform, data communication operations for the transceiver device;
generating, by the transceiver device, challenge information;
receiving, by the transceiver device from the first platform device, encrypted challenge information and a service-platform-provider-private-key-signed service platform public key;
verifying, by the transceiver device using a service platform provider public key, a service platform public key for the service platform that is included in the service-platform-provider-private-key-signed service platform public key to produce a verified service platform public key;
decrypting, by the transceiver device using the verified service platform public key, the encrypted challenge information to produce decrypted challenge information;
determining, by the transceiver device, that the decrypted challenge information matches the challenge information and, in response:
enabling, by the transceiver device, data communication operations for the transceiver device; and
locking, by the transceiver device, the transceiver device to operate with the service platform such that the transceiver device is prevented from operating with platform devices that are not included in the service platform.

15. The method of claim 14, further comprising:
setting, by the transceiver device during the first initialization operation, a lock-wait status for the transceiver device; and
setting, by the transceiver device in response to determining that the decrypted challenge information matches the challenge information, a lock status for the transceiver device.

16. The method of claim 14, further comprising:
decrypting, by the transceiver device using the verified service platform public key, the encrypted challenge information to produce a lock command.

17. The method of claim 14, further comprising:
disabling, by the transceiver device during a second initialization operation following connection to a second platform device of the one or more platform devices that are included in the service platform, data communication operations for the transceiver device;

encrypting, by the transceiver device using the service platform public key for the service platform, the challenge information to produce encrypted challenge information;

receiving, by the transceiver device from the second platform device, decrypted challenge information;

determining, by the transceiver device, whether the decrypted challenge information matches the challenge information; and enabling, by the transceiver device in response to determining that the decrypted challenge information matches the challenge information, data communication operations for the transceiver device.

18. The method of claim 14, further comprising:

receiving, by the transceiver device, an encrypted unlock command;

decrypting, by the transceiver device using the service platform provider public key, the encrypted unlock command to produce an unlock command;

unlocking, by the transceiver device in response to retrieving the unlock command, the transceiver device from operating with the service platform such that the transceiver device is allowed to operate with platform devices that are not included in the service platform.

19. The method of claim 18, further comprising:

decrypting, by the transceiver device using the service platform public key for the service platform, the encrypted unlock command to produce a partially encrypted unlock command; and decrypting, by the transceiver device using the service platform provider public key, the partially encrypted unlock command to produce the unlock command.

20. The method of claim 18, wherein the unlock command includes a transceiver device identifier, and wherein the method further comprises:

verifying, by the transceiver device, that the transceiver device identifier included in the unlock command corresponds to the transceiver device and, in response, unlocking the transceiver device from operating with the service platform such that the transceiver device is allowed to operate with platform devices that are not included in the service platform.

* * * * *